(12) United States Patent
Nagasawa et al.

(10) Patent No.: US 12,411,108 B2
(45) Date of Patent: Sep. 9, 2025

(54) ZETA-POTENTIAL MEASUREMENT JIG SET

(71) Applicant: Otsuka Electronics Co., Ltd., Osaka (JP)

(72) Inventors: Hiroya Nagasawa, Hirakata (JP); Katsushi Sasa, Hirakata (JP); Tamotsu Hamao, Hirakata (JP); Norihiko Murakami, Hirakata (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 314 days.

(21) Appl. No.: 18/128,251

(22) Filed: Mar. 30, 2023

(65) Prior Publication Data

US 2023/0333055 A1 Oct. 19, 2023

(30) Foreign Application Priority Data

Apr. 13, 2022 (JP) .................................. 2022-066570

(51) Int. Cl.
*G01N 27/447* (2006.01)
(52) U.S. Cl.
CPC . *G01N 27/44756* (2013.01); *G01N 27/44721* (2013.01)
(58) Field of Classification Search
CPC ....... G01N 27/44756; G01N 27/44721; G01N 27/44704; G01N 2021/513
See application file for complete search history.

(56) References Cited

U.S. PATENT DOCUMENTS

| | | | | |
|---|---|---|---|---|
| 4,061,543 A | * | 12/1977 | Bean | ...................... G01N 21/51 435/808 |
| 6,051,124 A | | 4/2000 | Aoki | |

(Continued)

FOREIGN PATENT DOCUMENTS

| | | |
|---|---|---|
| DE | 2857486 A1 * | 9/1980 |
| EP | 2423671 A1 | 2/2012 |

(Continued)

OTHER PUBLICATIONS

Kaufmann, English translation of DE2857486A1, 1980 (Year: 1980).*
Search Report of Sep. 14, 2023, for corresponding EP Patent Application No. 23163984.0, pp. 1-8.

*Primary Examiner* — Luan V Van
*Assistant Examiner* — Shizhi Qian
(74) *Attorney, Agent, or Firm* — HEA Law PLLC

(57) ABSTRACT

Provided is a zeta-potential measurement jig set capable of changing a sample or performing a plating process with a simple operation. The zeta-potential measurement jig set includes a frame and a measurement jig. The frame includes a first and second holding wall, a bottom wall that connects lower ends of the first and second holding wall and includes an anode plate and a cathode plate, and a first lock portion. The measurement jig includes a lower block and disposed on the bottom wall, a cell having a recess in which a sample is disposed and a cell communication hole, a middle block having a frame-like shape surrounding the recess in a plan view, an upper member covering an upper surface of the recess, and a second lock portion pressing the upper member toward the bottom wall. The first lock portion presses the middle block toward the bottom wall.

17 Claims, 15 Drawing Sheets

(56) References Cited

U.S. PATENT DOCUMENTS

| | | | | |
|---|---|---|---|---|
| 2013/0182254 A1* | 7/2013 | Hsieh | ............ | C08K 5/523 |
| | | | | 356/338 |
| 2015/0022212 A1* | 1/2015 | Jason | ............ | G01R 29/24 |
| | | | | 324/425 |
| 2017/0146443 A1* | 5/2017 | Rousseau | ......... | G01N 15/1404 |
| 2018/0080862 A1* | 3/2018 | Shigemaru | ......... | G01N 21/84 |
| 2021/0325340 A1 | 10/2021 | Nagasawa et al. | | |

FOREIGN PATENT DOCUMENTS

| | | | | |
|---|---|---|---|---|
| EP | 3896439 A1 | 10/2021 | | |
| GB | 2340937 A * | 3/2000 | ......... | G01N 15/0211 |
| JP | H05-312757 A | 11/1993 | | |
| JP | H10-104188 A | 4/1998 | | |
| JP | H11-23533 A | 1/1999 | | |
| JP | 2021-169982 A | 10/2021 | | |

* cited by examiner though which irradiation light and scattered light pass, at a corresponding position, the irradiation light being irradiated on a sample, the scattered light is the irradiation light scattered by the sample, a bottom wall that connects lower ends of the first holding wall and the second holding wall and includes an anode plate and a cathode plate, and a first lock portion having an arm shape, the measurement jig includes a lower block that includes an anode hole portion and a cathode hole portion, at which the anode plate and the cathode plate are respectively positioned, and is disposed on the bottom wall, the anode hole portion and the cathode hole portion being provided to a bottom of the lower block, a cell that includes a recess, in which the sample is disposed, and a cell communication hole communicating with each of the anode hole portion and the cathode hole portion on a bottom surface of the recess, is formed of a material that transmits the irradiation light and the scattered light, and is disposed on the lower block, a middle block that has a frame-like shape surrounding the recess in a plan view and is disposed above the cell, an upper member that is disposed on the middle block and covers an upper surface of the recess; and a second lock portion that presses the upper member toward the bottom wall to integrate the frame, the lower block, the cell, the middle block, and the upper member, the first lock portion elastically presses the middle block toward the bottom wall to integrate the frame, the lower block, the cell, and the middle block.

ZETA-POTENTIAL MEASUREMENT JIG SET

CROSS-REFERENCE TO RELATED APPLICATION

The present application claims priority from Japanese Application JP2022-066570 filed on Apr. 13, 2022, the content of which is hereby incorporated by reference into this application.

BACKGROUND OF THE INVENTION

1. Field of the Invention

The present invention relates to a zeta-potential measurement jig set.

2. Description of the Related Art

There has been known an electrophoretic mobility measuring device configured to measure an electrophoretic mobility or a zeta W potential of particles in a sample cell container, which move under an influence of an electric field. The electrophoretic mobility measuring device radiates light to a sample to which the electric field is applied, and detects light scattered by the sample with a light receiver. A velocity of the particles is calculated by analyzing a frequency component of the detected scattered light. As a result, a particle velocity distribution or a distribution of the electrophoretic mobility of the particles is obtained (see JP2021-169982A, JPH05-312757A, JPH10-104188A).

The electrophoretic mobility measuring device uses a cell having transparent walls, in which a sample obtained by suspending a dispersion of particles to be measured is disposed.

SUMMARY OF THE INVENTION

For measuring the zeta potential of the surface of a solid plate sample, a solid sample and a liquid sample are used. To fix a positional relationship between the cell in which the solid sample and the liquid sample are disposed and the electrophoretic mobility measuring device, a zeta-potential measurement jig set is used. If the liquid sample leaks out from the zeta-potential measurement jig set, the electrophoretic mobility measuring device may thereby get dirty or be damaged. Conventionally, the zeta potential measurement jig includes a plurality of members tightened together by a lock portion, and, when the lock portion is loosened so as to change the solid sample, the liquid sample may leak between the members (first problem).

The zeta-potential measurement jig set includes an anode plate and a cathode plate for applying an electric field to the sample. For plating an anode plate and a cathode plate, it is required that the anode plate and the cathode plate are removed from the zeta-potential measurement jig set and then plated, and are disposed again in the zeta-potential measurement jig set. This causes complicated operation (second problem).

The present disclosure has been made in view of the circumstances described above, and has a first object to provide a zeta-potential measurement jig set capable of exchanging a solid sample using a simple operation without leaking a liquid sample between members.

Further, a second object is to provide a zeta-potential measurement jig set capable of plating an anode plate and a cathode plate using a simple operation.

In order to solve the first problem, a zeta-potential measurement jig set according to an aspect of the present disclosure includes a frame, and a measurement jig fixed to the frame, wherein the frame includes a first holding wall and a second holding wall that are disposed to be opposed to each other and each have an opening, through which irradiation light and scattered light pass, at a corresponding position, the irradiation light being irradiated on a sample, the scattered light is the irradiation light scattered by the sample, a bottom wall that connects lower ends of the first holding wall and the second holding wall and includes an anode plate and a cathode plate, and a first lock portion having an arm shape, the measurement jig includes a lower block that includes an anode hole portion and a cathode hole portion, at which the anode plate and the cathode plate are respectively positioned, and is disposed on the bottom wall, the anode hole portion and the cathode hole portion being provided to a bottom of the lower block, a cell that includes a recess, in which the sample is disposed, and a cell communication hole communicating with each of the anode hole portion and the cathode hole portion on a bottom surface of the recess, is formed of a material that transmits the irradiation light and the scattered light, and is disposed on the lower block, a middle block that has a frame-like shape surrounding the recess in a plan view and is disposed above the cell, an upper member that is disposed on the middle block and covers an upper surface of the recess; and a second lock portion that presses the upper member toward the bottom wall to integrate the frame, the lower block, the cell, the middle block, and the upper member, the first lock portion elastically presses the middle block toward the bottom wall to integrate the frame, the lower block, the cell, and the middle block.

In order to solve the second problem, a zeta-potential measurement jig set according to another aspect of the present disclosure includes a frame, a measurement jig fixed to the frame, and a plating jig fixed to the frame, wherein the frame includes a first holding wall and a second holding wall that are disposed to be opposed to each other and each have an opening, through which irradiation light and scattered light pass, at a corresponding position, the irradiation light being irradiated on a sample, the scattered light is the irradiation light scattered by the sample, a bottom wall that connects lower ends of the first holding wall and the second holding wall and includes an anode plate and a cathode plate; and a first lock portion having an arm shape, one end portion of the first lock portion including a fitting portion, and the other end portion being pivotally supported by an end portion of the first holding wall and an end portion of the second holding wall at the locked position and an unlocked position, the measurement jig includes a cell that includes a recess in which a sample is disposed at a position where irradiation light is irradiated; and a first fitted portion that is elastically fitted with the fitting portion when the first lock portion is at the locked position, the plating jig includes a plating solution holder that includes a recess in which a plating solution for planting the anode plate and the cathode plate is disposed, and a second fitted portion that is elastically fitted with the fitting portion when the first lock portion is at the locked position, the measurement jig and the plating jig are selectively interchanged and attached to the frame.

DETAILED DESCRIPTION OF THE INVENTION

Embodiments of the present disclosure will be described below with reference to the drawings.

First Embodiment

Figure 1:
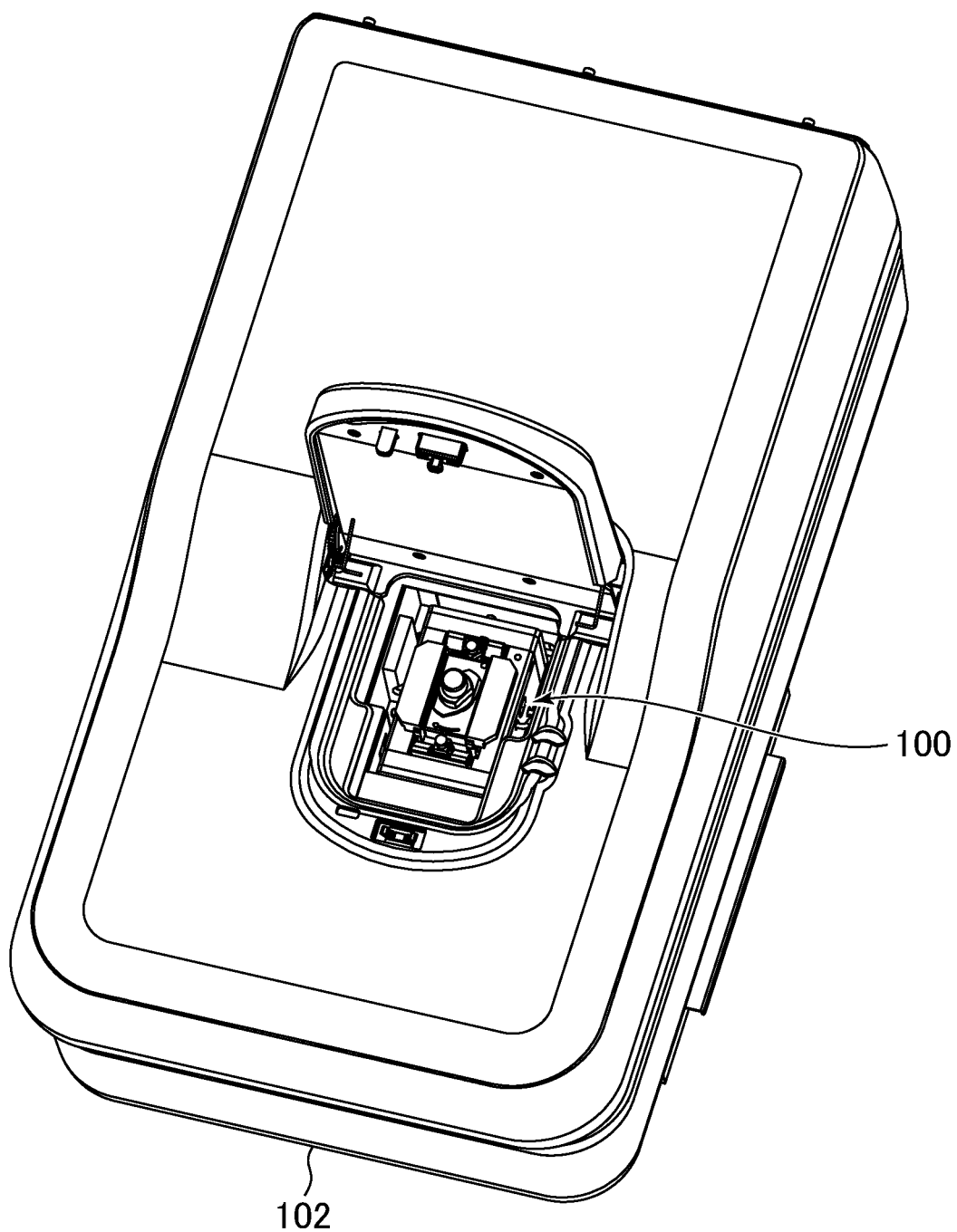
FIG. 1 is a perspective view of a zeta-potential measurement jig set disposed in an electrophoretic mobility measuring device.

A zeta-potential measurement jig set 100 is used for electrophoretic mobility measurement. Specifically, the zeta-potential measurement jig set 100 is disposed in an electrophoretic mobility measuring device 102 shown in FIG. 1 to measure a zeta potential. A cell 304 (to be described later) containing a sample is disposed inside the zeta-potential measurement jig set 100, and the electrophoretic mobility measuring device 102 applies an electric field to the sample disposed in the cell 304 via an anode plate 210 and a cathode plate 212 to be described later. An opening 220 is provided in each of a first holding wall 204 and a second holding wall 206, and the electrophoretic mobility measuring device 102 radiates light for measurement through one of the openings 220. The electrophoretic mobility measuring device 102 measures a zeta potential based on the scattered light exiting through the other opening 220.

Figure 2:
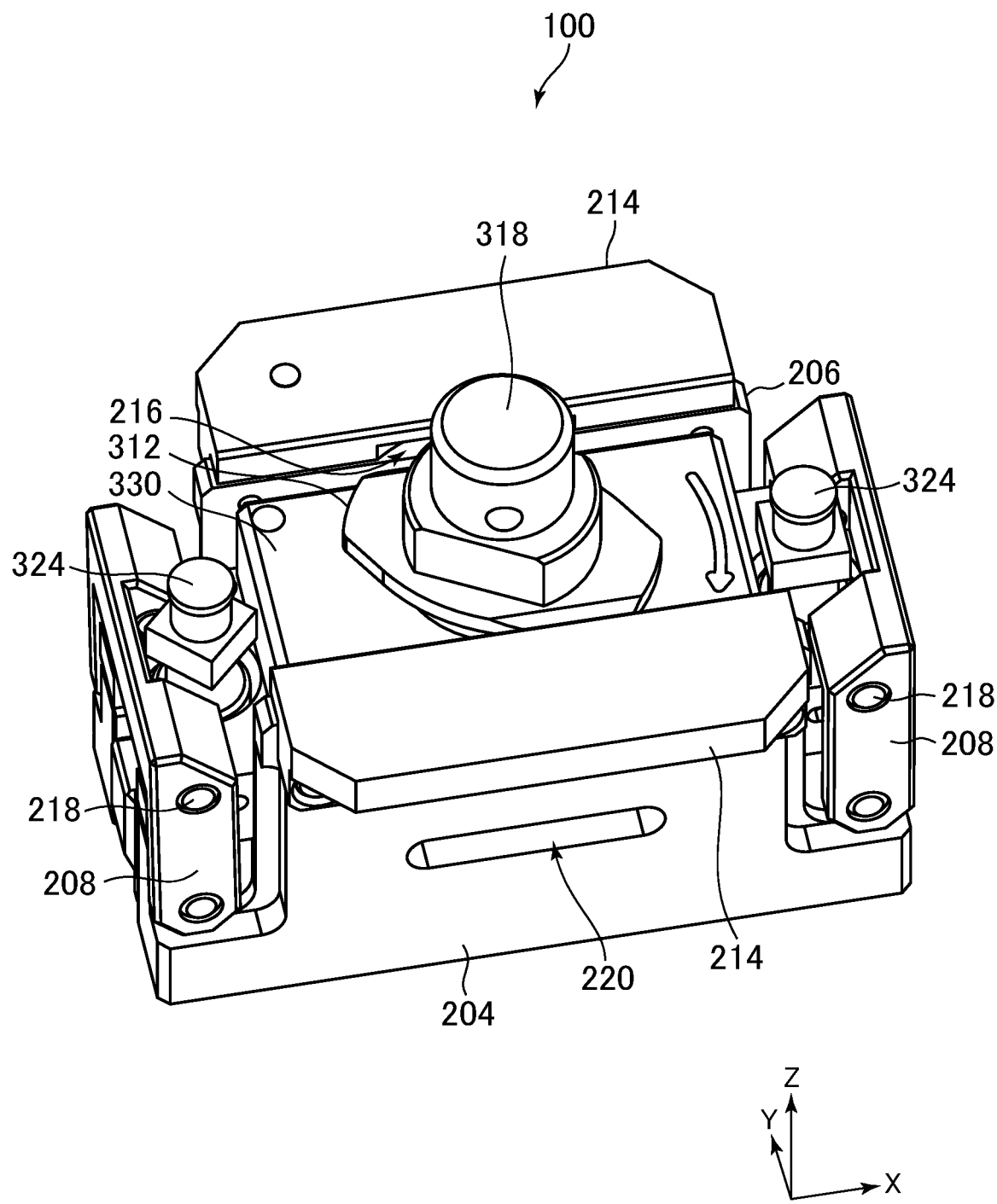
FIG. 2 is perspective view of a measurement jig fixed to a frame.
Figure 3:
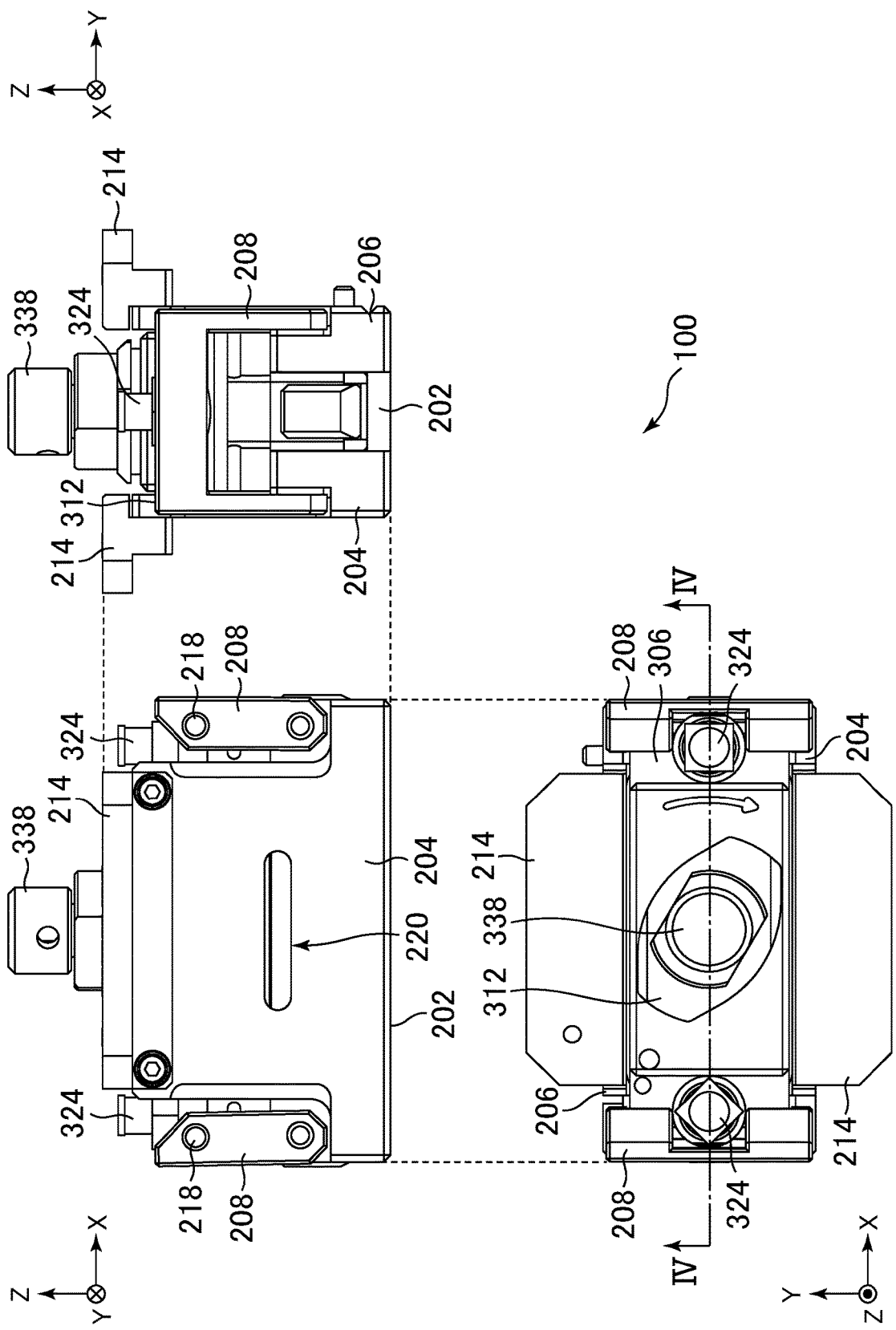
FIG. 3 is a three-side view of the measurement jig fixed to the frame.
Figure 4:
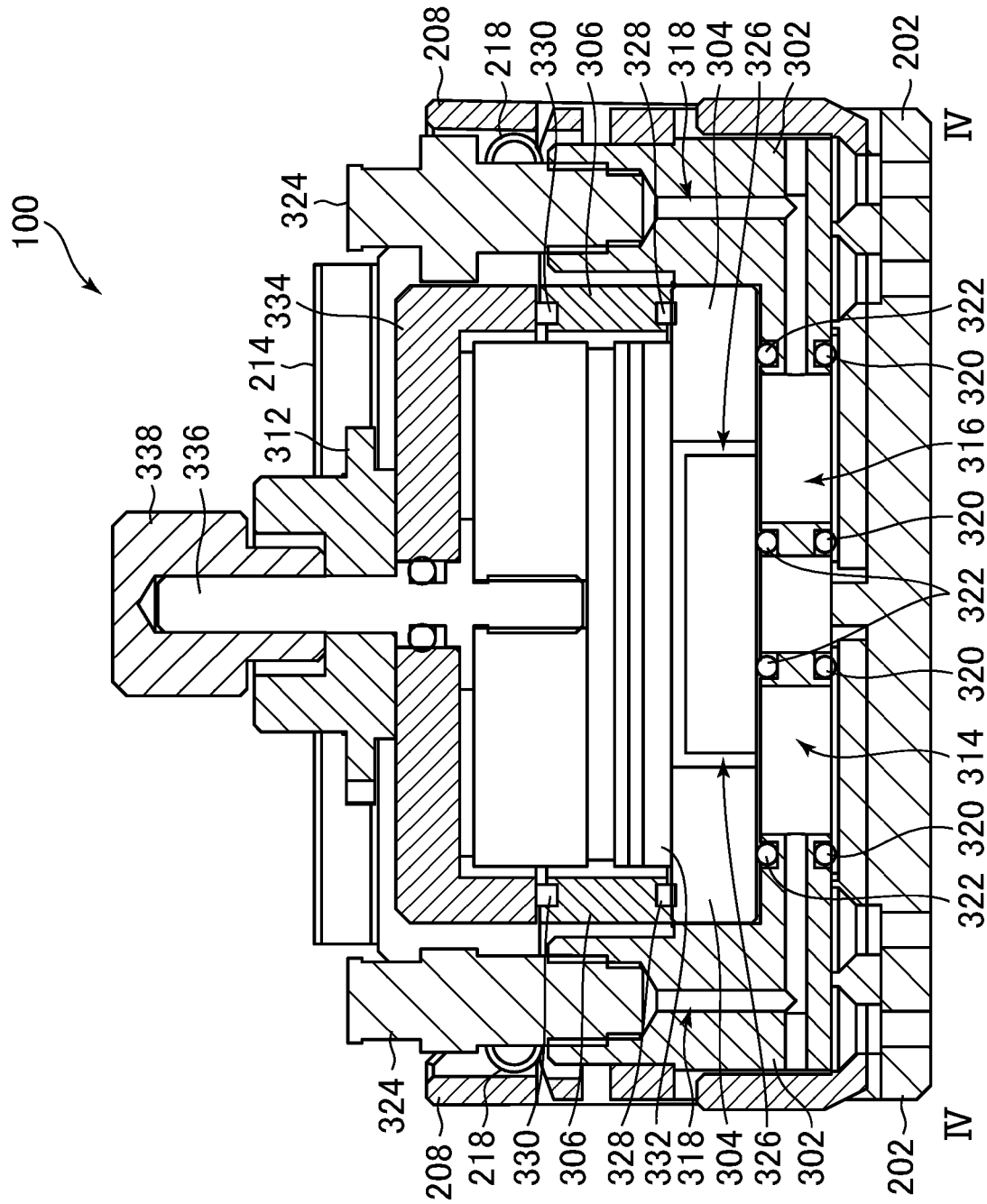
FIG. 4 is a cross-sectional view of the measurement jig fixed to the frame.
Figure 5:
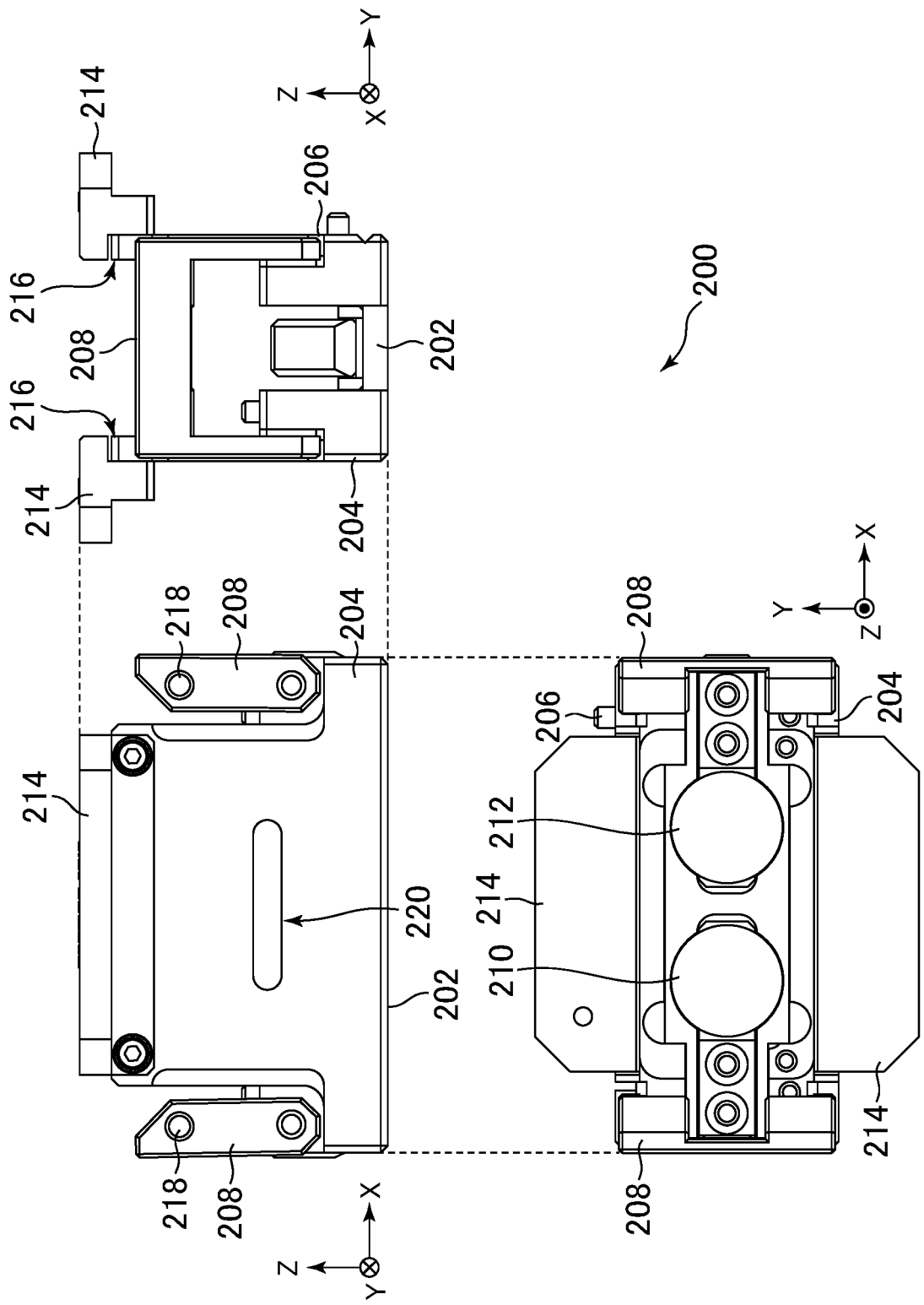
FIG. 5 is a three-side view of the frame.
Figure 6:
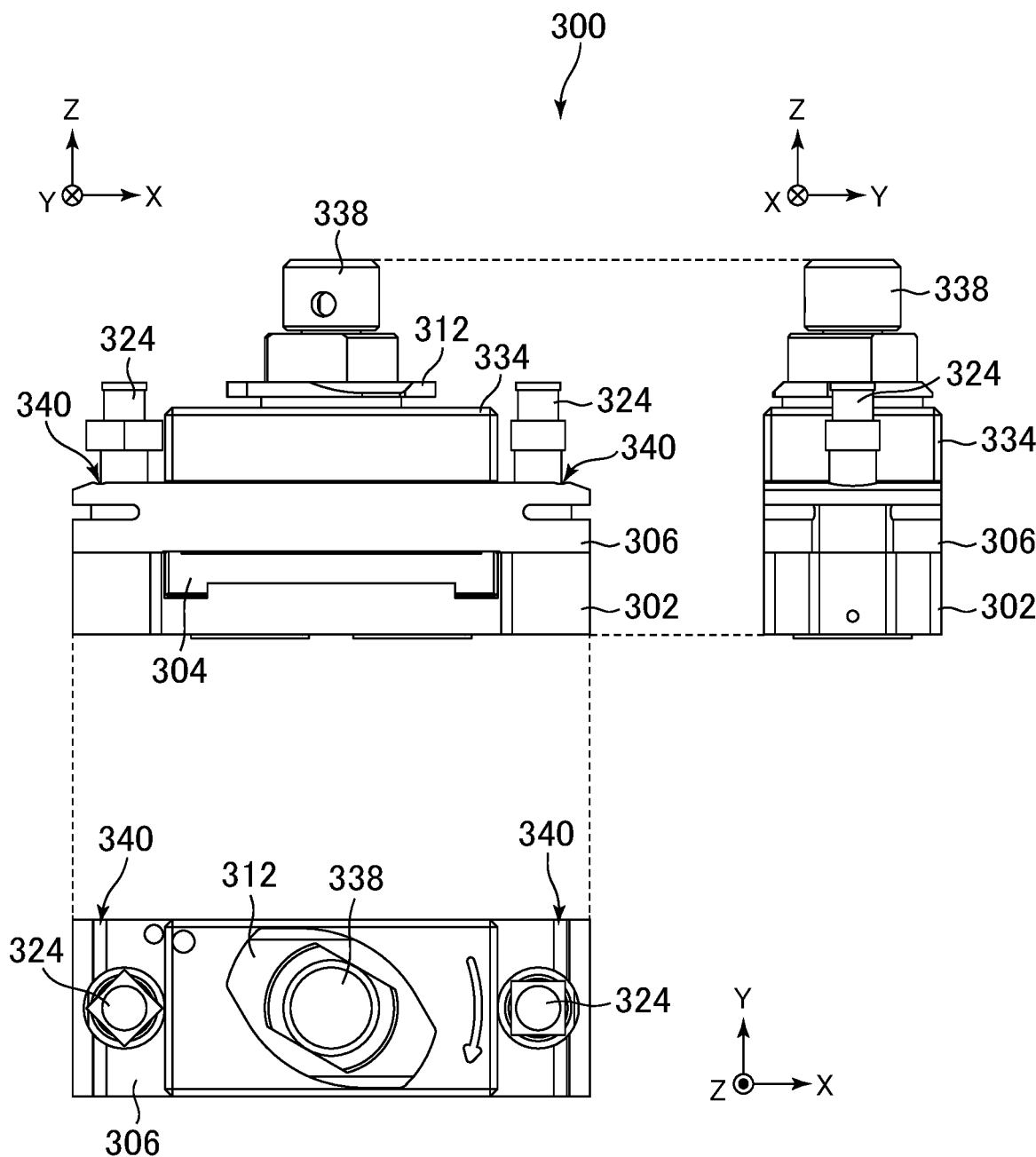
FIG. 6 is a three-side view of the measurement jig.

Referring to FIGS. 2 to 8, the components of the zeta-potential measurement jig set 100 according to the first embodiment will be described. FIG. 2 is a perspective view of the zeta-potential measurement jig set 100 in which a measurement jig 300 is fixed to a frame 200. FIG. 3 is a three-side view of the zeta-potential measurement jig set 100 in which the measurement jig 300 is fixed to the frame 200. FIG. 4 is a cross-sectional view of the zeta-potential measurement jig set 100 in which the measurement jig 300 is fixed to the frame 200. FIG. 5 is a three-side view of the frame 200, which is only illustrated among the components included in the zeta-potential measurement jig set 100. FIG. 6 is a three-side view of the measurement jig 300, which is only illustrated among the components included in the zeta-potential measurement jig set 100. FIG. 7 is a diagram illustrating a second lock portion 312 in a locked state and an unlocked state. FIG. 8 is a diagram illustrating a first lock portion 208 in a locked state and an unlocked state.

As shown in FIG. 2, the zeta-potential measurement jig set 100 according to the first embodiment includes the frame 200 and the measurement jig 300 fixed to the frame 200. The frame 200 includes a bottom wall 202 (see FIG. 3), the first holding wall 204, the second holding wall 206, and the first lock portion 208.

The bottom wall 202 connects the lower ends of the first holding wall 204 and the second holding wall 206, and includes the anode plate 210 and the cathode plate 212. Specifically, the bottom wall 202 is located at the lower ends of first holding wall 204 and the second holding wall 206, and fixes the positional relationship between the first holding wall 204 and the second holding wall 206. The bottom wall 202 includes the anode plate 210 and the cathode plate 212 provided therewith. One of the anode plate 210 and the cathode plate 212 is electrically connected to a terminal to which a predetermined voltage is applied from the electrophoretic mobility measuring device 102 through a conductive plate extending in the x axis direction. The other one is electrically connected to a terminal to which a predetermined voltage is applied from the electrophoretic mobility measuring device 102 through a conductive plate extending in the −x axis direction. A voltage higher than that applied from the electrophoretic mobility measuring device 102 to the cathode plate 212 is applied to the anode plate 210.

The first holding wall 204 and the second holding wall 206 respectively have the openings 220 at corresponding positions and are disposed so as to face each other. The irradiation light irradiated on the sample and the scattered light, which is the irradiation light scattered by the sample, pass through the openings 220. Specifically, as shown in FIGS. 2 to 5, the first holding wall 204 and the second holding wall 206 each have a plate-like portion, which has a large surface extending in the xz plane and is thin in the y-axis direction, and a grip portion 214 in the upper part (z-axis direction). The xz planes of the plate-like portions of the first holding wall 204 and the second holding wall 206 are disposed to face each other. Each of the plate-like portions has the opening 220 penetrating in the y-axis direction at a corresponding position. Light to irradiate the sample passes through one of the openings 220, and light scattered by the sample passes through the other one of the openings 220. The plate-like portion and the grip portion 214 may be integrally formed.

The first holding wall 204 and the second holding wall 206 respectively have engagement holes 216, in which respective end portions of the second lock portion 312 are engaged. Specifically, each of the grip portions 214 of the first holding wall 204 and the second holding wall 206 has an engagement hole 216 at a position corresponding to the second lock portion 312. The engagement holes 216 are provided on the opposite surfaces of the first holding wall 204 and the second holding wall 206, and engaged with the distal end portions of the second lock portion 312 in the long-axis direction. The engagement holes 216 each have a region in contact with the upper surface of the second lock portion 312 when the long-axis direction of the second lock portion 312 is positioned in a direction in which the first holding wall 204 and the second holding wall 206 face each other.

FIGS. 2 to 8 describe a case in which the frame 200, the bottom wall 202, the first holding wall 204, and the second holding wall 206 are integrally formed. However, the bottom wall 202, the first holding wall 204, and the second holding wall 206 may be individually formed and fixed together using screws, for example.

The first lock portion 208 has an arm shape. For example, one end of the first lock portion 208, which is an arm, includes a fitting portion 218 that is elastically fitted with the first fitted portion 340 on the upper surface of a middle block 306 in the locked position, and the other end is pivotally supported by the end portions of the first holding wall 204 and the second holding wall 206 in the locked position and the unlocked position.

Specifically, as shown in FIGS. 3 and 5, the first locking portion 208 are provided at the ends of the first holding wall 204 and the second holding wall 206, respectively, in the x-axis direction. When viewed in the xz plane, the first lock portion 208 includes an elongated portion pivotally supported by the first holding wall 204 and an elongated portion pivotally supported by the second holding wall 206. As the side view of yz plane shows, the first lock portion 208 includes a portion that connects the two elongated portions. The first lock portion 208 has a fitting portion 218 at one end of the elongated portion (portion indicated in the xz plane). The fitting portion 218 is fitted with a first fitted portion 340 (described later) provided on the upper surface of the middle block 306 at the locked position. The fitting portion 218 is cylindrical, for example, but may be of any other shape.

Figure 8A:
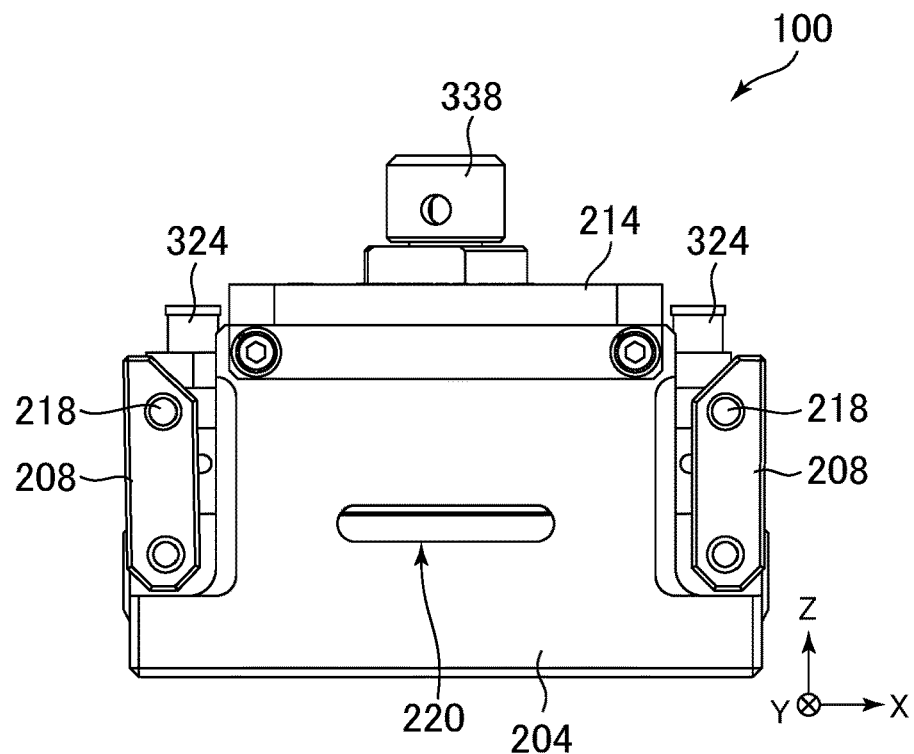
FIGS. 8A and 8B are diagrams showing an open and closed state of a first lock portion.
Figure 8B:
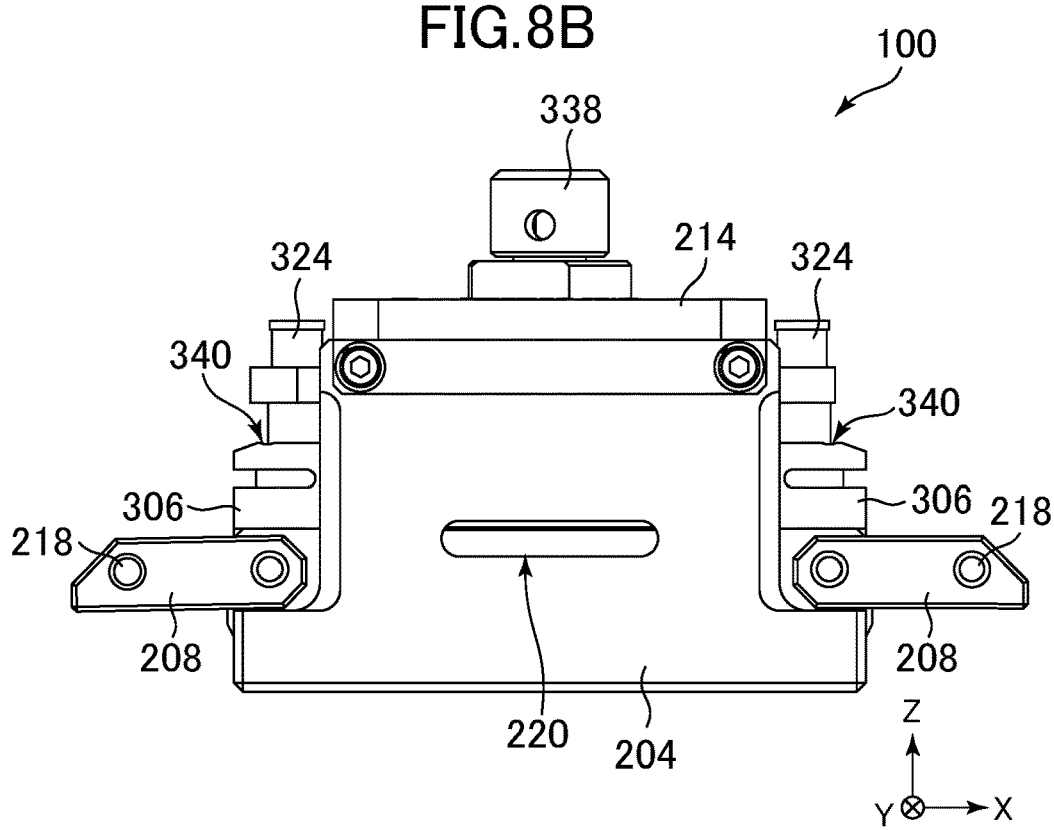

The fitting portion 218 is formed of resin, for example, and is elastically fitted with the first fitted portion 340 provided on the upper surface of the middle block 306. The other end of the elongated portion (portion indicated in the xz plane) of the first lock portion 208 is pivotally supported by the end portions of the first holding wall 204 and the second holding wall 206. This allows the first lock portion 208 to rotate about the y-axis. FIG. 8A shows a locked state, and FIG. 8B shows an unlocked state. When the first lock portion 208 is in the locked state, the first lock portion 208 elastically presses the middle block 306 toward the bottom wall 202 so as to integrate the frame 200, a lower block 302, the cell 304, and the middle block 306.

FIG. 8A and FIG. 8B illustrate the case where the first lock portion 208 is pivotally supported by the first holding wall 204 and the second holding wall 206, but the first lock portion 208 may be pivotally supported by the bottom wall 202.

The measurement jig 300 includes the lower block 302, the cell 304, the middle block 306, the upper member, and the second lock portion 312.

The bottom of the lower block 302 includes an anode hole portion 314 and a cathode hole portion 316, at which the anode plate 210 and the cathode plate 212 are respectively located, and is disposed on the bottom wall 202. Specifically, for example, the lower block 302 includes a space in which the cell 304 is disposed, and the anode hole portion 314 and the cathode hole portion 316 under the space. The anode hole portion 314 and the cathode hole portion 316 are respectively provided at positions corresponding to the anode plate 210 and the cathode plate 212 of the bottom wall 202. The anode hole portion 314 and the cathode hole portion 316 are spaces in which a liquid sample is disposed through a supply path 318.

The lower block 302 includes a first seal 320, which surrounds the anode hole portion 314 and the cathode hole portion 316, on a surface in contact with the bottom wall 202, and a second seal 322, which surrounds the anode hole portion 314 and the cathode hole portion 316, on a surface in contact with the cell 304. Specifically, the first seal 320 is an O-ring surrounding the anode hole portion 314 and the cathode hole portion 316 provided on the surface of the lower block 302 in contact with the bottom wall 202. When at least one of the first lock portion 208 and the second lock portion 312 presses the lower block 302 toward the bottom wall 202, the first seal 320 prevents the liquid sample from leaking between the lower block 302 and the bottom wall 202. The second seal 322 is an O-ring surrounding the anode hole portion 314 and the cathode hole portion 316 provided on the surface of the lower block 302 in contact with the cell 304. In a state where at least one of the first lock portion 208 and the second lock portion 312 presses the cell 304 toward the bottom wall 202, the first seal 320 prevents the liquid sample from leaking between the cell 304 and the lower block 302.

The lower block 302 includes a liquid sample supply knob 324 and a supply path 318 for supplying the liquid sample to the anode hole portion 314 and the cathode hole 316. Specifically, as shown in FIG. 4, the lower block 302 includes a space (supply path 318) connecting the side surfaces of the anode hole portion 314 and the cathode hole portion 316 and the portion where a liquid sample supply knob 324 is disposed. The liquid sample supply knob 324 is separable from the other parts, and can supply the liquid sample to the anode hole portion 314 and the cathode hole portion 316 through the supply path 318. As such, the liquid sample can be easily removed and supplied without removing the solid sample from the zeta-potential measurement jig set 100.

The cell 304 includes a recess in which a sample is disposed and a cell communication hole 326 communicating with each of the anode hole portion 314 and the cathode hole portion 316 on the bottom surface of the recess. The cell 304 is formed of a material that transmits the irradiation light and the scattered light and disposed on the lower block 302. Specifically, for example, the cell 304 is formed of transparent glass. As shown in FIG. 4, the cell 304 has a recess with a flat bottom surface. in which a sample is disposed on an upper surface. On the bottom surface of the recess, the cell 304 includes the cell communication hole 326 penetrating to the anode hole portion 314 and the cell communication hole 326 penetrating to the cathode hole portion 316. At the time of measurement, the space of the recess and the cell communication hole 326 is filled with the solid sample and the liquid sample. The recess is located on the side of the openings 220 of the first holding wall 204 and the second holding wall 206, and functions as a measurement space. As such, the sample disposed in the measurement space is irradiated with light.

The middle block 306 has a frame-like shape surrounding the recess in a plan view, and is disposed above the cell 304. Specifically, the middle block 306 is a frame-like member disposed above the cell 304, for example. The middle block 306 includes a hole at a position where all of the recesses provided in the cell 304 are visible when viewed from the above in a state where the middle block 306 is disposed above the cell 304. The hole is shaped to surround the side surface of the cell upper-surface retaining portion 332. The hole is smaller than the outer edge of the cell 304, and thus, the middle block 306 has a region overlapping with the cell 304.

The middle block 306 includes the first fitted portion 340 that is elastically fitted with the fitting portion 218 when the end portion of the first lock portion 208 is in the locked position. Specifically, for example, the middle block 306 includes a recess (first fitted portion 340) shaped along the cylindrical fitting portion 218 near the end portions in the x-axis direction. When the end of the first lock portion 208 is in the locked position, the cylindrical fitting portion 218 is elastically fitted with the first fitted portion 340.

If at least one of the first fitted portion 340 and the fitting portion 218 has elasticity, the other may be formed of a rigid member. For example, if the fitting portion 218 is formed of an elastic resin such as rubber, the first fitted portion 340 may be formed of a rigid member such as metal. In contrast, if the first fitted portion 340 is formed of an elastic resin such as rubber, the fitting portion 218 may be formed of a rigid member such as metal. Further, both the fitting portion 218 and the first fitted portion 340 may be formed of an elastic resin such as rubber.

The surface of the middle block 306 in contact with the cell 304 includes a third seal 328 surrounding the recess and a fourth seal 330 on a surface in contact with the upper member. Specifically, for example, the third seal 328 is an O-ring provided on the surface of the middle block 306 in contact with the cell 304 in a region where the middle block 306 and the cell 304 overlap. That is, the third seal 328 is an O-ring surrounding the periphery of the recess of the cell 304. When at least one of the first lock portion 208 and the second lock portion 312 is in the locked state, the third seal 328 prevents the sample from leaking between the middle block 306 and the cell 304. The fourth seal 330 is an O-ring provided on a surface of the middle block 306 in contact with the upper block 334. The fourth seal 330 is shaped to surround the hole of the frame-like middle block 306 and is provided in a region in contact with the upper block 334 included in the upper member. The fourth seal 330 seals between the upper block 334 and the middle block 306 while the second lock portion 312 presses the upper block 334 toward the bottom wall 202. That is, when the second lock portion 312 does not press the upper block 334 toward the bottom wall 202, even if the first lock portion 208 is in the locked state, the fourth seal 330 does not seal between the upper block 334 and the middle block 306.

The upper member is disposed on the middle block 306 and covers the upper surface of the recess. The upper member includes a cell upper-surface retaining portion 332, an upper block 334, and a pressing portion.

The cell upper-surface retaining portion 332 is disposed on the cell 304 and presses the upper surface of the cell 304 toward the bottom wall 202. Specifically, for example, as shown in FIG. 4, the cell upper-surface retaining portion 332 is shaped along the inner wall of the hole of the frame-like middle block 306 and is disposed in contact with the upper surface of the cell 304. A surface of the cell upper-surface retaining portion 332 in contact with the cell 304 is formed flat. The cell upper-surface retaining portion 332 is pressed toward the cell 304 by the pressing portion.

The upper block 334 is disposed above the middle block 306, and presses the middle block 306 and the fourth seal 330 provided in the middle block 306 toward the bottom wall 202. Specifically, the upper block 334 is disposed above the cell upper-surface retaining portion 332 and the middle block 306. The upper side of the upper block 334 is in contact with the second lock portion 312. As will be described later, the second lock portion 312 rotates and the upper block 334 is thereby pressed toward the bottom wall 202. This causes the upper block 334 to press the middle block 306 and the fourth seal 330 provided in the middle block 306 toward the bottom wall 202.

The upper block 334 includes a through-hole passing in the vertical direction above the cell 304. A pressing portion is disposed in the through-hole. The side wall of the through-hole is not threaded, and the cell upper-surface retaining portion 332 can be thereby pressed by the pressing portion toward the bottom wall 202 separately from the pressing applied by the second lock portion 312 to the cell upper-surface retaining portion 332.

The pressing portion is disposed in the through-hole and presses the cell upper-surface retaining portion 332 against the cell 304. Specifically, for example, the pressing portion includes a cylindrical shaft portion 336 disposed in the through-hole, a knob portion 338 provided above the shaft portion 336 (z-axis direction), and a block-like member provided below the shaft portion 336 (−z axis direction). The knob portion 338 and the shaft portion 336 are fixed. The knob portion 338 rotates in the plane parallel to the bottom wall 202 (in xy plane), and the cylindrical shaft portion 336 thereby rotates about the axis of the cylinder. The block-like member includes a hole that is engaged with the shaft portion 336 on the upper side, and the hole has a threaded wall surface. When the shaft portion 336 rotates, the shaft portion 336 fitted in the hole presses the block-like member downward (to the cell 304).

The second lock portion 312 presses the upper member toward the bottom wall 202, thereby integrating the frame 200, the lower block 302, the cell 304, the middle block 306, and the upper member. Specifically, for example, the second lock portion 312 is shaped to have a long axis direction and a short axis direction and is changed in a thickness from the center to the end portion. The second lock portion 312 is substantially elliptical in the long axis direction and the short axis direction, and inclined on the upper surface such that the height in the z-axis direction decreases toward the tip. The second lock portion 312 is disposed on the upper block 334.

Figure 7A:
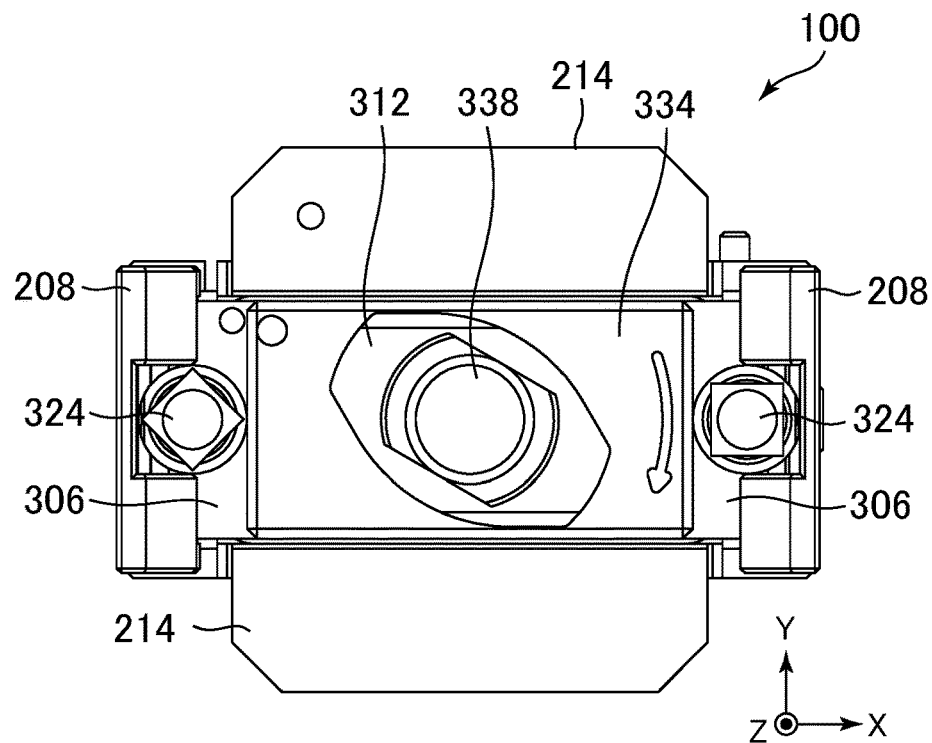
FIGS. 7A and 7B are diagrams showing an open and closed state of a second lock portion.

The second lock portion 312 is rotatable in the in-plane direction of the bottom wall 202, and the end portion thereof is engaged with the engagement hole 216, thereby pressing the upper member toward the bottom wall 202. Specifically, for example, the second lock portion 312 is rotatable in the xy plane. As shown in FIG. 7A, when the long axis of the second lock portion 312 is rotated counterclockwise by 60 degrees, the second lock portion 312 is not engaged with the engagement hole 216 provided in the grip portion 214. When the second lock portion 312 is not engaged with the engagement holes 216 of the first holding wall 204 and the second holding wall 206, the second lock portion 312 is in the unlocked state.

Figure 7B:
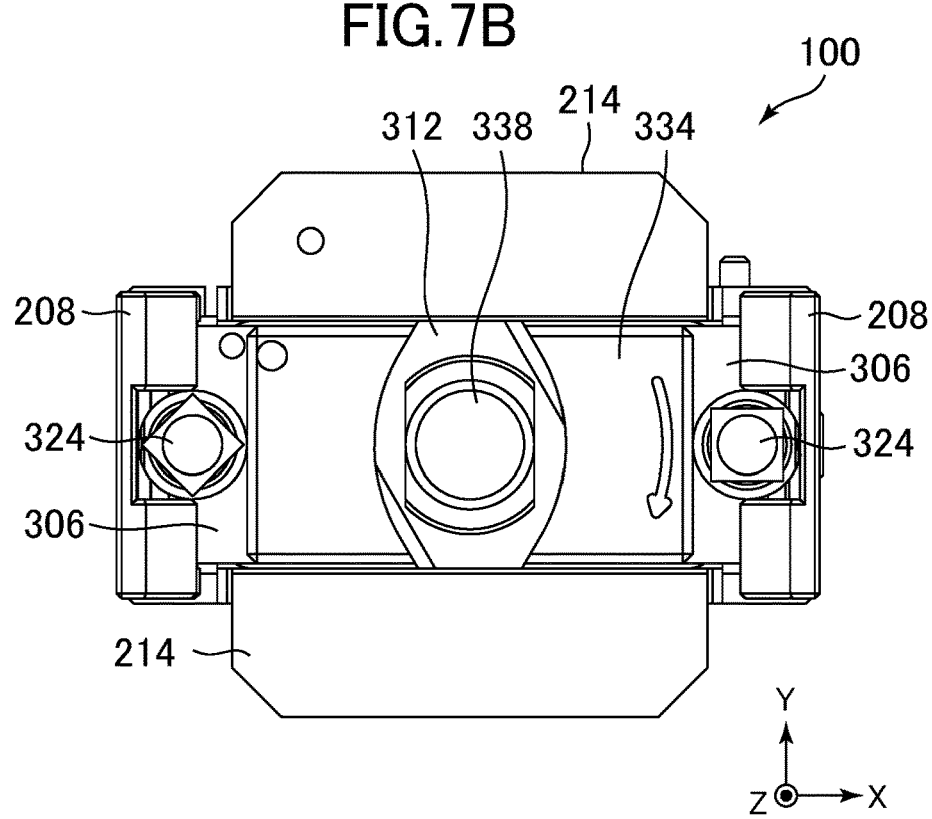

As shown in FIG. 7B, when the long axis of the second lock portion 312 is parallel to the y-axis, the second lock portion 312 is fitted with the engagement hole 216 provided in the grip portion 214. When the second lock portion 312 is engaged with the engagement holes 216 of the first holding wall 204 and the second holding wall 206, the second lock portion 312 is in the locked state. When the second lock portion 312 is fitted with the engagement holes 216, the inclined upper surface of the second lock portion 312 presses the upper block 334 disposed below the second lock portion 312 toward the bottom wall 202. This causes the second lock portion 312 to press the upper member toward the bottom wall 202, thereby integrating the frame 200, the lower block 302, the cell 304, the middle block 306, and the upper member. In the case where hood-shaped portion is formed on the grip portion 214 instead of the engagement hole 216, the lower surface of the hood-shaped portion is in contact with the upper surface of the second lock portion 312.

As described above, according to the zeta-potential measurement jig set 100 according to the first embodiment, the first lock portion 208 presses the middle block 306 toward the bottom wall 202 so as to integrate the frame 200, the lower block 302, the cell 304, and the middle block 306. Further, the second lock portion 312 presses the upper member toward the bottom wall 202 so as to integrate the frame 200, the lower block 302, the cell 304, the middle block 306, and the upper member. The upper member can be removed when the second lock portion 312 is loosened with the first lock portion 208 in the locked state. This prevents the liquid sample from leaking between the members of the bottom wall 202, the lower block 302, the cell 304, and the middle block 306, and serves to easily replace the solid sample disposed in the recess of the cell 304 without removing the liquid sample.

Second Embodiment

Next, a zeta-potential measurement jig set 100 according to the second embodiment will be described. The zeta-potential measurement jig set 100 according to the second embodiment is used for electrophoretic mobility measurement, and includes a frame 200, a measurement jig 300 fixed to the frame 200, and a plating jig 400 fixed to the frame 200.

The measurement jig 300 and the plating jig 400 are selectively interchanged and attached to the frame 200. Specifically, when plating an anode plate 210 and a cathode plate 212 of the frame 200, the plating jig 400 is attached to the frame 200 and fixed to the frame 200 by the first lock portion 208. The plating jig 400 fixed to the frame 200 is disposed in the electrophoretic mobility measuring device 102 shown in FIG. 1, and the plating process is performed. When performing electrophoretic mobility measurement, the measurement jig 300 is attached to the frame 200 and fixed to the frame 200 by the first lock portion 208. The measurement jig 300 fixed to the frame 200 is disposed on the electrophoretic mobility measuring device 102 shown in FIG. 1, and the zeta potential is measured. The method of the plating process and measuring the zeta potential will be described later.

Figure 9:
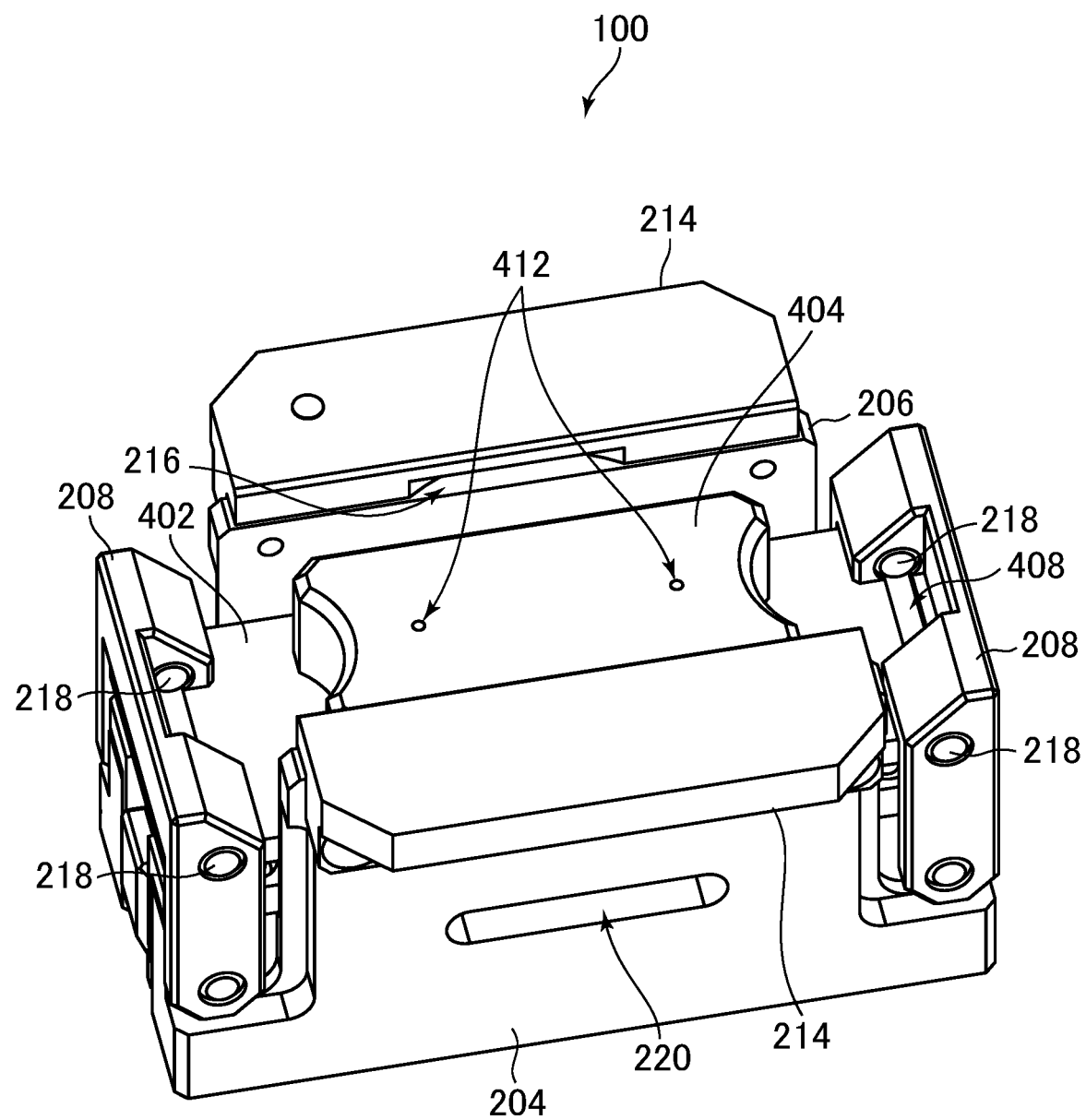
FIG. 9 is a perspective view of a plating jig fixed to the frame.
Figure 10:
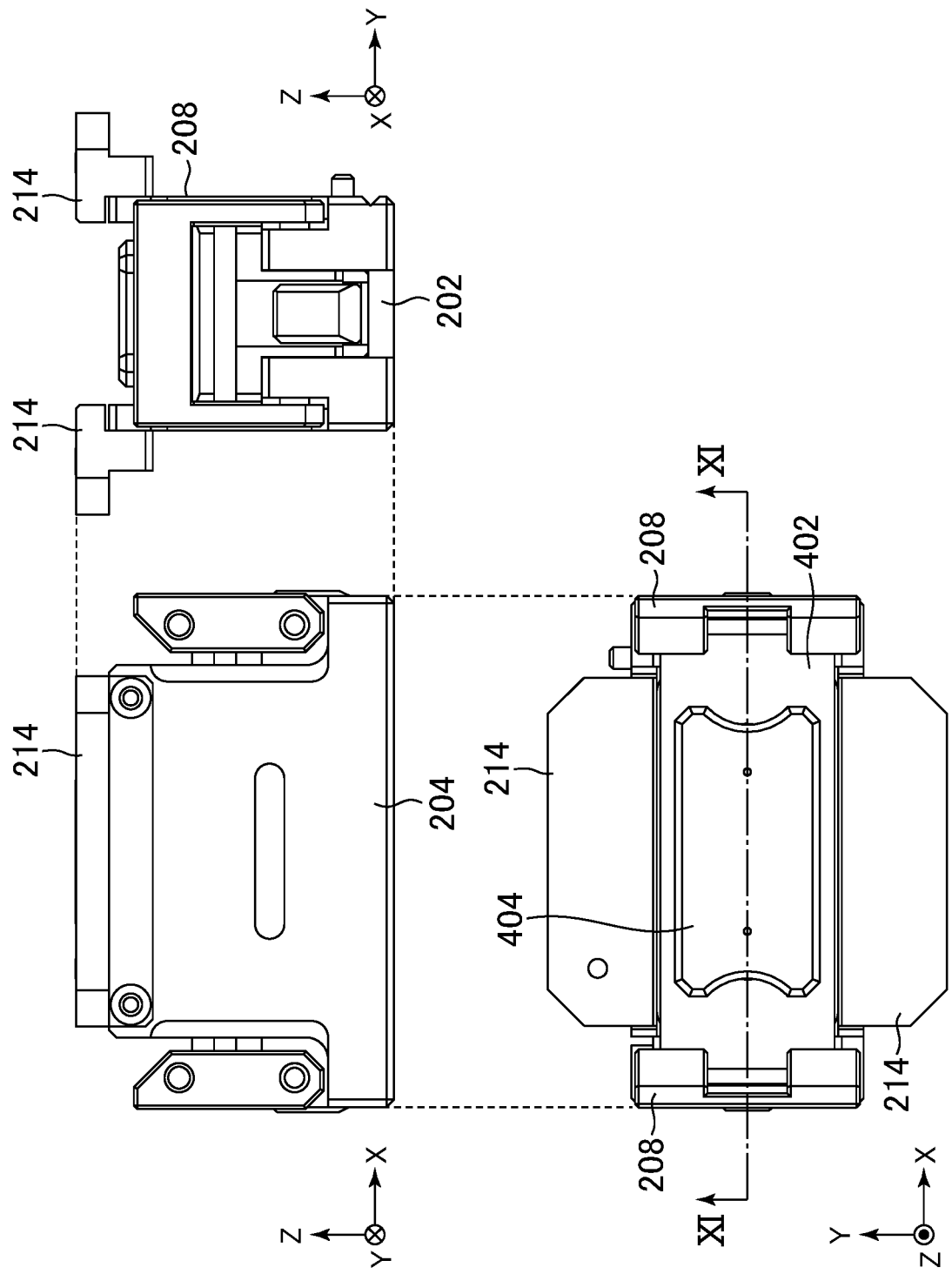
FIG. 10 is a three-side view of the plating jig fixed to the frame.
Figure 11:
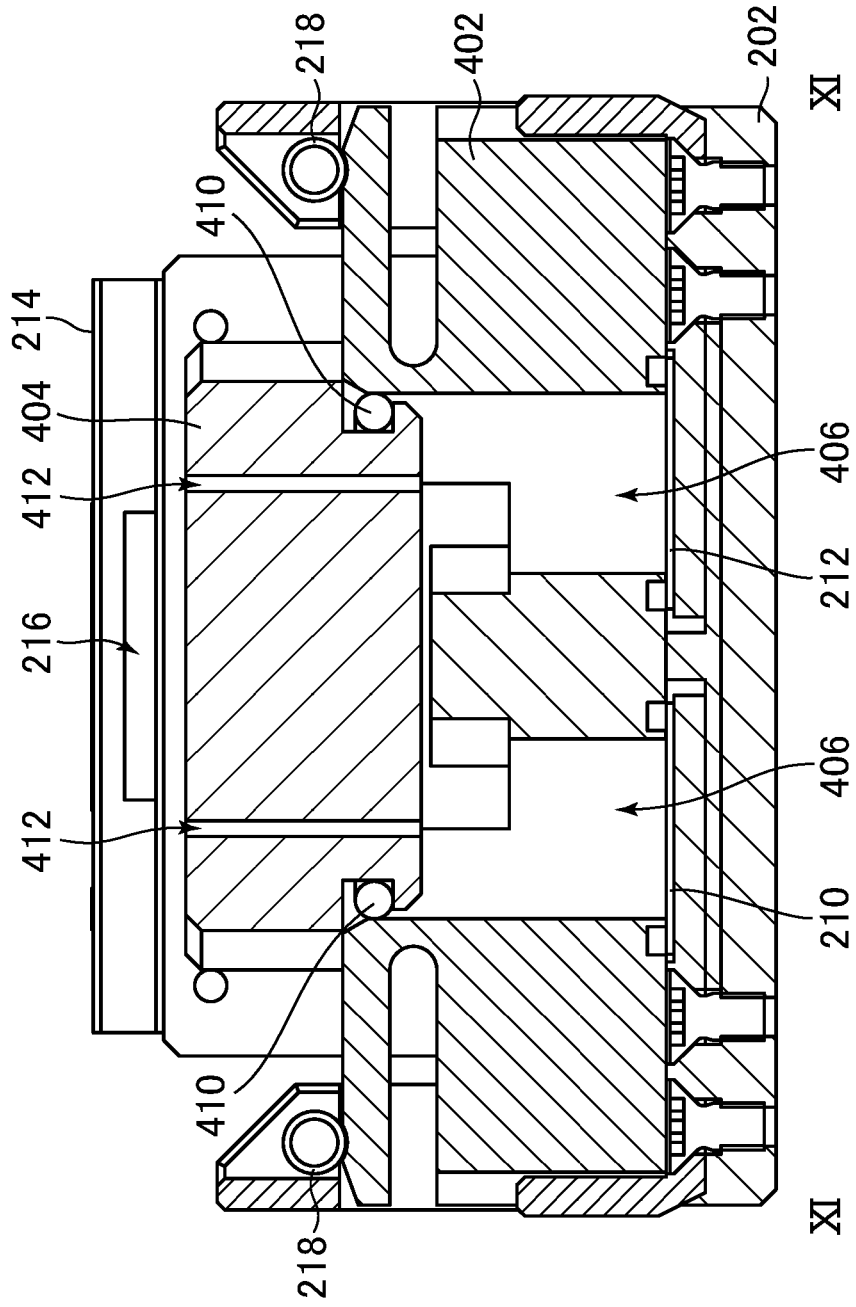
FIG. 11 is a cross-sectional view of the plating jig fixed to the frame.
Figure 12:
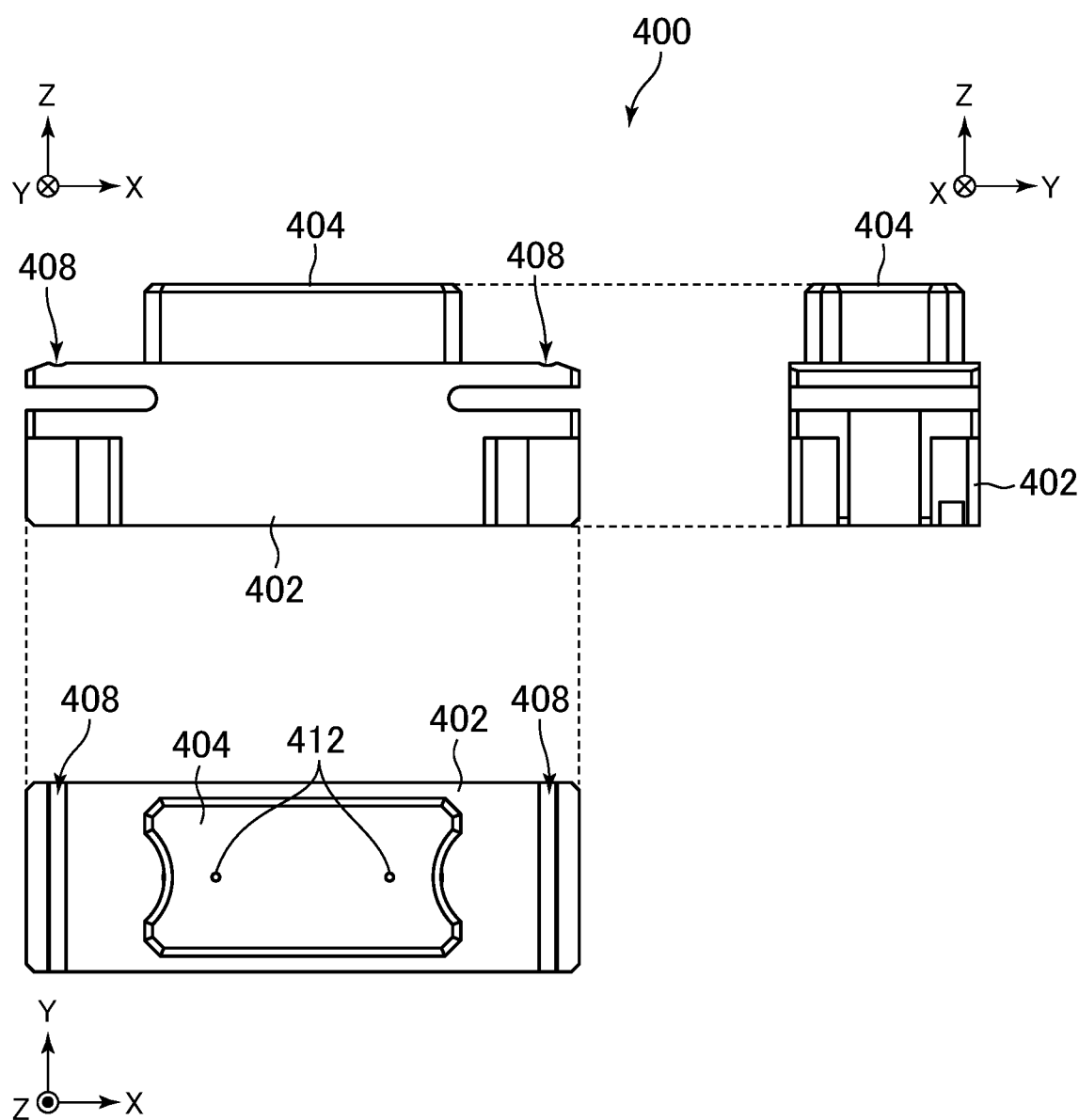
FIG. 12 is a three-side view of the plating jig.
Figure 13:
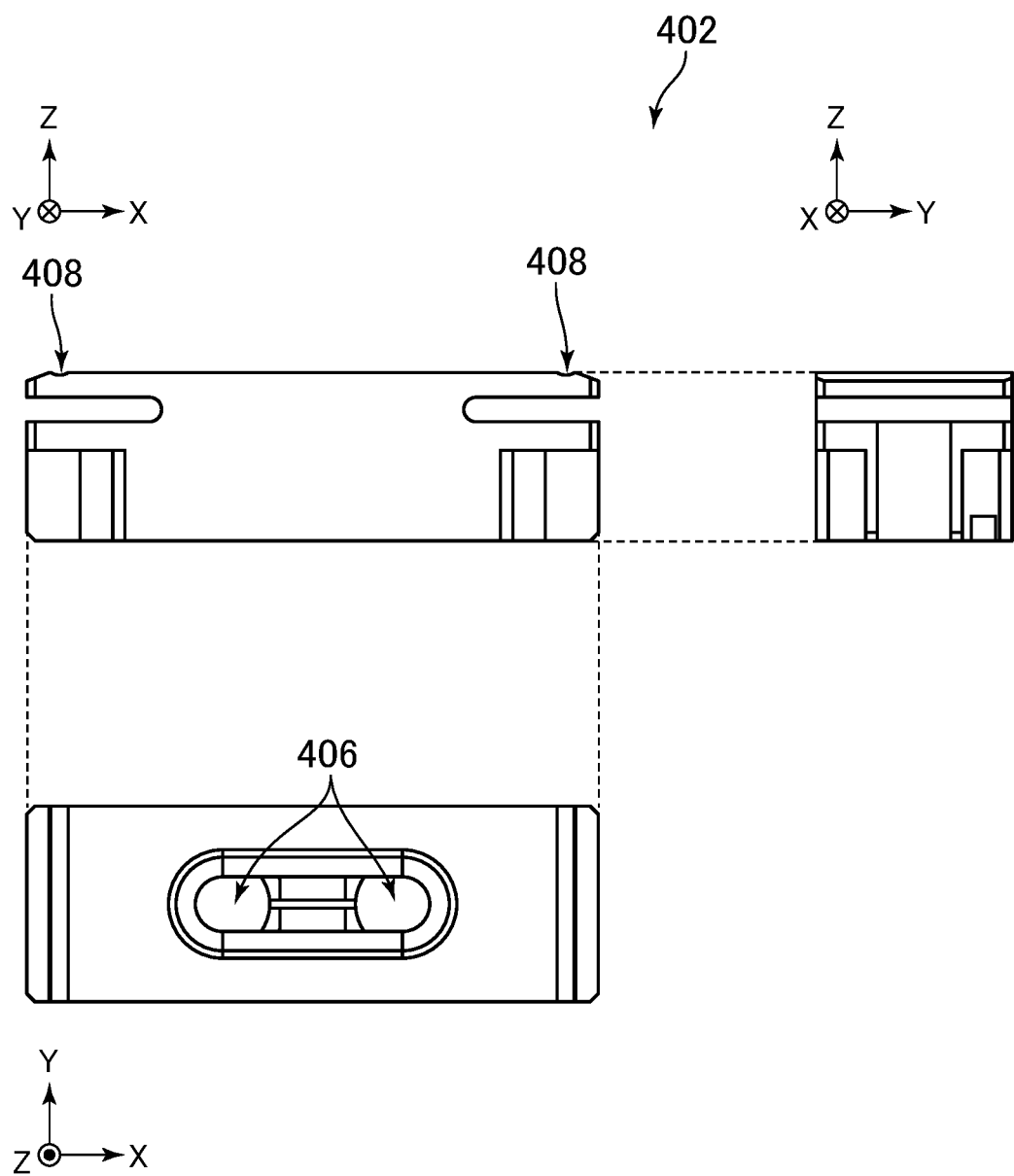
FIG. 13 is a three-side view of a plating solution holder included in the plating jig.
Figure 14:
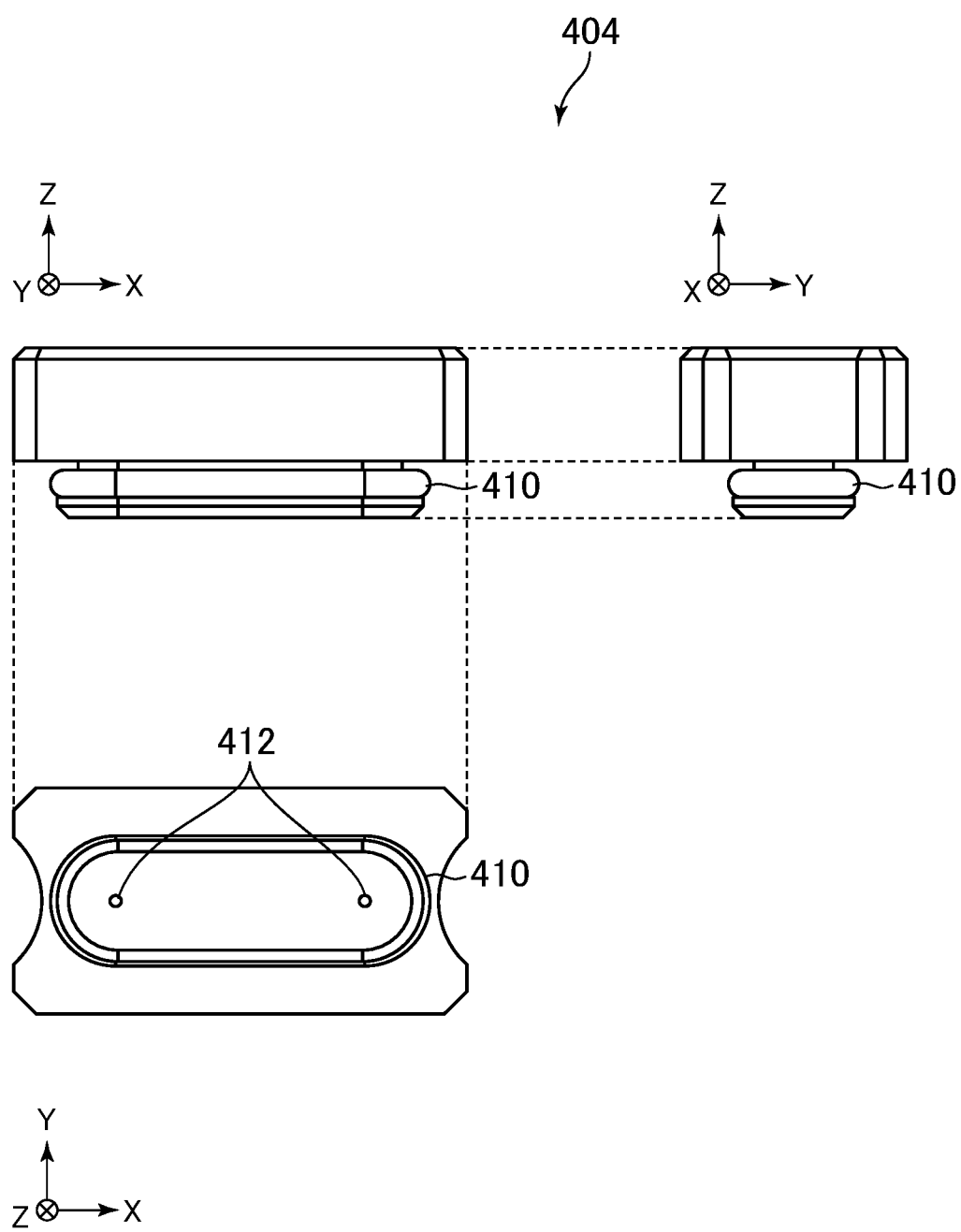
FIG. 14 is a three-side view of a lid included in the plating jig.

In the following, referring to FIGS. 9 to 14, the components of the zeta-potential measurement jig set 100 according to the second embodiment will be described. FIG. 9 is a perspective view of the zeta-potential measurement jig set 100 in which the plating jig 400 is fixed to the frame 200. FIG. 10 is a three-side view of the zeta-potential measurement jig set 100 in which the plating jig 400 is fixed to the frame 200. FIG. 11 is a cross-sectional view of the zeta-potential measurement jig set 100 in which the plating jig 400 is fixed to the frame 200. FIG. 12 is a three-side view of the plating jig 400, which is only illustrated among the components included in the zeta-potential measurement jig set 100. FIG. 13 is a three-sided view of a plating solution holder 402, which is only illustrated among the components included in the plating jig 400. FIG. 14 is a three-side view of a lid 404, which is only illustrated among the components included in the plating jig 400. Only FIG. 14 shows a bottom view instead of a top view.

The frame 200 is the same as the frame 200 in the first embodiment. That is, as shown in FIG. 5, the frame 200 includes a first holding wall 204, a second holding wall 206, a bottom wall 202, and a first lock portion 208. The first holding wall 204 and the second holding wall 206 respectively have the openings 220 at corresponding positions and are disposed so as to face each other. The irradiation light irradiated on the sample and the scattered light, which is the irradiation light scattered by the sample, pass through the openings 220. The first holding wall 204 and the second holding wall 206 respectively have engagement holes 216, in which respective end portions of the second lock portion 312 are engaged. The bottom wall 202 connects the lower ends of the first holding wall 204 and the second holding wall 206, and includes the anode plate 210 and the cathode plate 212. The first lock portion 208 has an arm shape. One end of the first lock portion 208 includes a fitting portion 218, and the other end is pivotally supported by the end portions of the first holding wall 204 and the second holding wall 206 in the locked position and the unlocked position. When the other end of the first lock portion 208 is in the locked state, the first lock portion 208 elastically presses the middle block 306 toward the bottom wall 202 so as to integrate the frame 200, a lower block 302, the cell 304, and the middle block 306.

The measurement jig 300 is fixed to the frame 200 and used for zeta potential measurement. Here, the measurement jig 300 is the same as the measurement jig 300 in the first embodiment, but may be different. When the measurement jig 300 is the same as in the first embodiment, the measurement jig 300 includes a lower block 302, a cell 304, a middle block 306, an upper member, and a second lock portion 312.

The bottom of the lower block 302 includes an anode hole portion 314 and a cathode hole portion 316, at which the anode plate 210 and the cathode plate 212 are respectively located, and is disposed on the bottom wall 202. The lower block 302 includes a first seal 320, which surrounds the anode hole portion 314 and the cathode hole portion 316, on a surface in contact with the bottom wall 202, and a second seal 322, which surrounds the anode hole portion 314 and the cathode hole portion 316, on a surface in contact with the cell 304. The lower block 302 has a supply path 318 for supplying the liquid sample to the anode hole portion 314 and the cathode hole 316.

The cell 304 has a recess in which a sample is disposed at a position where irradiation light is irradiated. The cell 304 includes a recess in which a sample is disposed and a cell communication hole 326 communicating with each of the anode hole portion 314 and the cathode hole portion 316 on the bottom surface of the recess. The cell 304 is formed of a material that transmits the irradiation light and the scattered light and disposed on the lower block 302.

The middle block 306 has a frame-like shape surrounding the recess in a plan view, and is disposed above the cell 304. The surface of the middle block 306 in contact with the cell 304 includes a third seal 328 surrounding the recess and a fourth seal 330, which is along the outer periphery of the middle block 306, on a surface in contact with the upper member. The middle block 306 includes the first fitted portion 340 that is elastically fitted with the fitting portion 218 when the end portion of the first lock portion 208 is in the locked position. The first fitted portion 340 is elastically fitted with the fitting portion 218 when the first lock portion 208 is in the locked position.

The upper member is disposed on the middle block 306 and closes the upper surface of the recess, and includes a cell upper-surface retaining portion 332, an upper block 334, and a pressing portion. The cell upper-surface retaining portion 332 is disposed on the cell 304 and presses the upper surface of the cell 304 toward the bottom wall 202. The pressing portion is disposed in a through-hole and presses the cell upper-surface retaining portion 332 against the cell 304. The upper block 334 is disposed above the middle block 306, and presses the middle block 306 and the fourth seal 330 provided in the middle block 306 toward the bottom wall 202. The upper block 334 includes a through-hole passing in the vertical direction above the cell 304.

The second lock portion 312 presses the upper member toward the bottom wall 202, thereby integrating the frame 200, the lower block 302, the cell 304, the middle block 306, and the upper member. The second lock portion 312 is shaped to have a long axis direction and a short axis direction and is changed in a thickness from the center to the end portion. The second lock portion 312 is rotatable in the in-plane direction of the bottom wall 202, and the end portion thereof is engaged with the engagement hole 216, thereby pressing the upper member toward the bottom wall 202.

In the second embodiment, the first locking portion 208 only needs to fix the measurement jig 300 to the frame 200, and may not have a function of integrating the middle block 306, the cell 304, and the lower block 302. As such, the measurement jig 300 may be different from that of the first embodiment if the measurement jig 300 includes at least the cell 304 in which the sample is disposed and the first fitted portion 340 that is elastically fitted with the fitting portion 218 when the end portion of the first lock portion 208 is in the locked position. For example, the lower block 302 and the middle block 306 may be integrally formed.

As shown in FIGS. 12 to 14, the plating jig 400 includes the plating solution holder 402 and the lid 404. The plating solution holder 402 includes a recess, a plating solution communication hole 406, and a second fitted portion 408.

Specifically, the plating solution holder 402 is a member disposed between the first holding wall 204 and the second holding wall 206 on the bottom wall 202. The plating solution holder 402 has a planar shape having a length in the x-axis direction substantially the same as that of the bottom wall 202 and a length in the y-axis direction substantially the same as the distance between the first holding wall 204 and the second holding wall 206 so that the plating solution holder 402 is fixed by the first lock portion 208 when disposed in the frame 200.

The plating solution holder 402 includes the second fitted portion 408 that is elastically fitted with the fitting portion 218 when the first lock portion 208 is in the locked position. Specifically, for example, two second fitted portions 408 are provided in the vicinity of the ends of the upper surface of the plating solution holder 402 in the x-axis direction. The second fitted portion 408 is shaped similarly to the first fitted portion 340 provided in the middle block 306 and is a recess having a shape along the cylindrical fitting portion 218. Further, the second fitted portion 408 is provided at a position where the height of the second fitted portion 408 when the plating solution holder 402 is fixed to the frame 200 is the same as the height of the first fitted portion 340 when the measurement jig 300 is fixed to the frame 200. With this configuration, when the plating solution holder 402 is attached to the frame 200 where the measurement jig 300 is fixed, the cylindrical fitting portion 218 is elastically fitted with the second fitted portion 408 when the end portion of the first lock portion 208 is in the locked position. That is, the frame 200 can be shared in both the measurement and plating processes.

The plating solution holder 402 includes a space for holding the plating solution. Specifically, for example, as shown in FIG. 13, the plating solution holder 402 has a recess in which a plating solution for plating the anode plate 210 and the cathode plate 212 is disposed on the upper surface. Further, the plating solution holder 402 includes the plating solution communication hole 406 on the bottom surface of the recess in which the plating solution is disposed so as to communicate with the anode hole portion 314 and the cathode hole portion 316. When the plating solution is injected into the recess, the plating solution comes into contact with the anode plate 210 and the cathode plate 212 via the plating solution communication hole 406.

The lid 404 is fitted into the recess, in which the plating solution is disposed, and covers the upper surface of the recess. Specifically, for example, as shown in FIG. 14, the lid 404 has a convex portion, which is fitted with the recess of the plating solution holder 402 on the bottom surface, and a block-shaped grip portion on the top surface. The convex portion has a fifth seal 410 surrounding the periphery thereof so that the plating solution does not leak to the outside when the lid 404 is fitted with the plating solution holder 402. The fifth seal 410 is an O-ring, for example. The lid 404 may have any shape if the plating solution does not leak and is sealed, and is not limited to the illustrated shape.

The lid 404 has a pressure release hole 412 that communicates the upper surface with the recess in which the plating solution is disposed. Specifically, the lid 404 has the two pressure release holes 412 that communicate the bottom surface with the upper surface at the places in the region surrounded by the fifth seal 410 on the bottom surface (the top portion of the convex portion). The lid 404 is fitted with the plating solution holder 402, and this prevents dangerous plating solution from scattering when the plating process is performed. In some cases, air bubbles may be generated from the plating solution during the plating process. In such a case, the air bubbles are released outside through the pressure release holes 412, and this prevents the air pressure in the space holding the plating solution from increasing and the lid 404 from being blown off.

Figure 15:
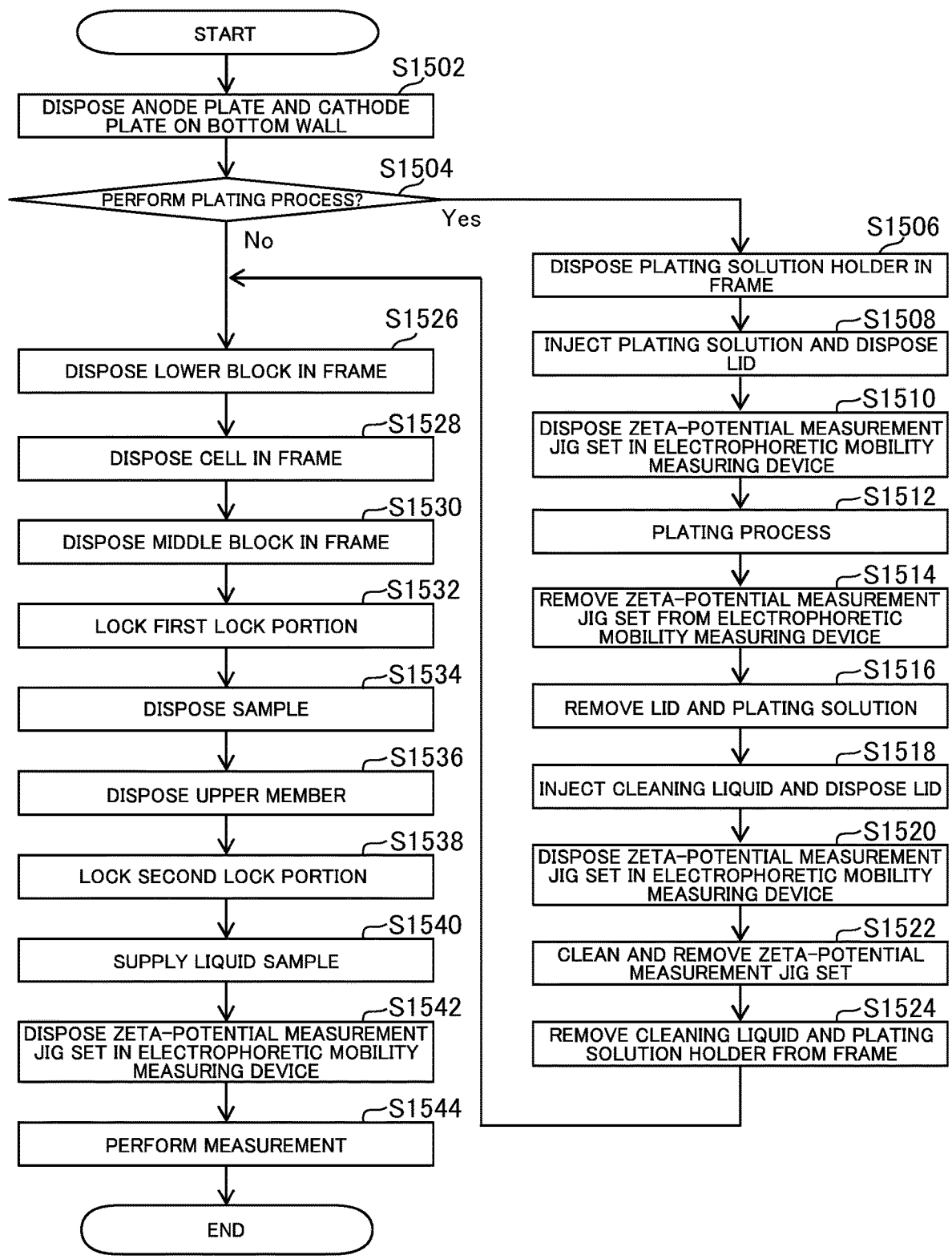
FIG. 15 is a flowchart showing a method of a plating process and a method of measuring a zeta potential.

Next, referring to the flow chart shown in FIG. 15, a method of plating and a method of measuring the zeta potential using the zeta-potential measurement jig set 100 according to the second embodiment will be described. In the following, a case will be described in which a platinum black plating process is performed as the plating process. In a case where platinum black plating is applied to the anode plate 210 and the cathode plate 212, it is not preferable to store the anode plate 210 and the cathode plate 212 with the anode plate 210 and the cathode plate 212 being in contact with the atmosphere. As such, assume that the anode plate 210 and the cathode plate 212 are stored separately from the bottom wall 202.

First, the anode plate 210 and the cathode plate 212 are disposed on the bottom wall 202 (S1502). Specifically, the anode plate 210 and the cathode plate 212 are disposed in the bottom wall 202 where the voltage is applied. Next, when the plating process is performed, the process proceeds to S1506, and when the plating process is not performed, the process proceeds to S1526 (S1504). The anode plate 210 and the cathode plate 212 to which platinum black plating is applied can be used about 10 to 20 times by one plating process. When the measurement is repeated, the platinum black plating is peeled off or deteriorated, and thus, the plating process needs to be performed again every time a predetermined number of measurements are performed. Here, assume that the plating process needs to be performed.

Subsequently, the plating solution holder 402 is disposed in the frame 200 and fixed to the frame 200 by the first lock portion 208 (S1506). A plating solution for platinum black plating is then injected into the recess provided in the plating solution holder 402, and the lid 404 is disposed (S1508). For example, an aqueous solution of platinum hexachloride acid and lead acetate is injected into the recess provided in the plating solution holder 402, and the lid 404 is disposed.

Next, the zeta-potential measurement jig set 100 formed of the plating jig 400, in which the plating solution is sealed in S1508, and the frame 200 is disposed in the electrophoretic mobility measuring device 102 (S1510). The electrophoretic mobility measuring device 102 is used to apply a voltage to the anode plate 210 and the cathode plate 212 for a predetermined period, and whereby the platinum black plating process is performed (S1512). When the platinum black plating is completed, the zeta-potential measurement jig set 100 is removed from the electrophoretic mobility measuring device 102 (S1514).

Subsequently, the lid 404 is removed from the removed plating jig 400 so as to remove the plating solution (S1516). While the plating solution holder 402 is fixed to the frame 200, the cleaning liquid is injected into the recess of the plating solution holder 402 and the lid 404 is disposed (S1518). The cleaning liquid is sulfuric acid, for example.

Next, the zeta-potential measurement jig set 100 including the plating jig 400, in which the cleaning liquid is sealed in S1518, and the frame 200 is disposed in the electrophoretic mobility measuring device 102 (S1520). The electrophoretic mobility measuring device 102 is used for applying a voltage to the anode plate 210 and the cathode plate 212 for a predetermined period, and whereby the anode plate 210 and the cathode plate 212 are cleaned. When the cleaning process is completed, the zeta-potential measurement jig set 100 is removed from the electrophoretic mobility measuring device 102 (S1522). Further, the cleaning liquid is removed from the plating solution holder 402, and the plating solution holder 402 is removed from the frame 200 (S1524). The plating process is completed through the steps S1506 to S1524.

When the plating process is not required in S1504 and is completed in S1524, the lower block 302 is disposed in the frame 200 for measurement (S1526). Subsequently, the cell 304 is disposed in the frame 200 on the lower block 302 (S1528). Further, the middle block 306 is disposed in the frame 200 (S1530). The first lock portion 208 is then locked (S1532). The first fitted portion 340 and the second fitted portion 408 are disposed such that the position of the second fitted portion 408 when the plating solution holder 402 is fixed to the frame 200 is the same as the position of the first fitted portion 340 when the measurement jig 300 is fixed to the frame 200. As such, not only the plating jig 400 but also the measurement jig 300 can be fixed to the common frame 200. The first lock portion 208 is set to the locked state, and thereby elastically pressing the middle block 306 toward the bottom wall 202 so as to integrate the frame 200, a lower block 302, the cell 304, and the middle block 306.

The sample is then disposed (S1534). In S1532, the upper surface of the cell 304 is not closed by the upper member, and thus, the solid sample can be disposed in a recess provided in the upper surface of the cell 304. After the sample is disposed, the upper member and the second lock portion 312 are disposed (S1536). The second lock portion 312 is rotated, and the second lock portion 312 is thereby brought into the locked state. When the second lock portion 312 is locked, the second lock portion 312 presses the upper member toward the bottom wall 202 (S1538). The liquid sample supply knob 324 is then removed, and the liquid sample is supplied to each of the anode hole portion 314 and the cathode hole portion 316 through the supply path 318 (S1540).

Next, the zeta-potential measurement jig set 100 including the measurement jig 300, in which the sample is disposed in the steps up to S1540, and the frame 200 is disposed in the electrophoretic mobility measuring device 102 (S1542). The electrophoretic mobility measuring device 102 is used to apply a voltage to the anode plate 210 and the cathode plate 212 for a predetermined period of time so as to perform the measurement (S1544). When the measurement is completed, the zeta-potential measurement jig set 100 is removed from the electrophoretic mobility measuring device 102.

Through the above steps, the plating process and the measurement are completed. As described, not only the plating jig 400 but also the measurement jig 300 can be fixed to the common frame 200. As such, when the measurement is performed after the plating process, it is not necessary to remove or dispose of the electrodes. This simplifies the operation. Further, it is not necessary to remove or dispose of the electrodes, it is possible to reduce the risk that the plated electrode comes into contact with the tweezers, for example, and is peeled off.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A zeta-potential measurement jig set to be used for measuring electrophoretic mobility, comprising:
   a frame; and
   a measurement jig fixed to the frame, wherein
   the frame includes:
     a first holding wall and a second holding wall that are disposed to be opposed to each other and each of the first holding wall and the second holding wall have an opening, through which irradiation light and scattered light pass, at a corresponding position on the respective first holding wall and the second holding wall, the irradiation light being irradiated on a sample, the scattered light being the irradiation light scattered by the sample;
     a bottom wall that connects lower ends of the first bolding wall and the second holding wall and includes an anode plate and a cathode plate; and
     a first lock portion having an arm shape;
   wherein the measurement jig includes:
     a lower block that includes an anode hole portion and a cathode hole portion, at which the anode plate and the cathode plate are respectively positioned, and disposed on the bottom wall, the anode hole portion and the cathode hole portion being provided at a bottom of the lower block;
     a cell that includes a recess, in which the sample is disposed, and a cell communication hole communicating with each of the anode hole portion and the cathode hole portion on a bottom surface of the recess, being formed of a material that transmits the irradiation light and the scattered light, and is disposed on the lower block;
     a middle block that has a frame-like shape surrounding the recess in a plan view and is disposed above the cell;
     an upper member that is disposed on the middle block and covers an upper surface of the recess; and
     a second lock portion that presses the upper member toward the bottom wall to integrate the frame, the lower block, the cell, the middle block, and the upper member, and
   the first lock portion elastically presses the middle block toward the bottom wall to integrate the frame, the lower block, the cell, and the middle block.

2. The zeta-potential measurement jig set according to claim 1, wherein the lower block includes:
a first seal that surrounds the anode hole portion and the cathode hole portion on a surface in contact with the bottom wall; and
a second seal that surrounds the anode hole portion and the cathode hole portion on a surface in contact with the cell,
the middle block includes:
a third seal that surrounds the recess on a surface in contact with the cell; and
a fourth seal in contact with the upper member.

3. The zeta-potential measurement jig set according to claim 2, wherein
the upper member includes:
a cell upper-surface retaining portion that is disposed on the cell and presses an upper surface of the cell toward the bottom wall; and
an upper block that is disposed above the middle block and presses the middle block and the fourth seal provided in the middle block toward the bottom wall.

4. The zeta-potential measurement jig set according to claim 3, wherein
the upper block includes a through-hole passing in a vertical direction above the cell, and
the measurement jig further includes a pressing portion that is disposed in the through-hole and presses the cell upper-surface retaining portion against the cell.

5. The zeta-potential measurement jig set according to claim 1, wherein one end portion of the first lock portion, which is an arm, includes a fitting portion that is elastically fitted with a first fitted portion provided on an upper surface of the middle block at a locked position, and the other end portion of the first lock portion is pivotally supported by an end portion of the first holding wall and an end portion of the second holding wall at the locked position and an unlocked position.

6. The zeta-potential measurement jig set according to claim 1, wherein the second lock portion has a long axis direction and a short axis direction and is changed in a thickness from a center to end portions,
the first holding wall and the second holding wall respectively have engagement holes that are engaged with the respective end portions of the second lock portion, and
the second lock portion is rotatable in an in-plane direction of the bottom wall, and presses the upper member toward the bottom wall when the respective end portions of the second lock portion are engaged with the respective engagement holes.

7. The zeta-potential measurement jig set according to claim 1, wherein
the lower block includes a supply path that supplies the sample to the anode hole portion and the cathode bole portion.

8. A zeta-potential measurement jig set to be used for measuring electrophoretic mobility, comprising:
a frame;
a measurement jig fixed to the frame; and
a plating jig fixed to the frame, wherein
the frame includes:
a first holding wall and a second holding wall that are disposed to be opposed to each other and each of the first holding wall and the second holding wall have an opening, through which irradiation light and scattered light pass, at a corresponding position on the respective first holding wall and the second holding wall, the irradiation light being irradiated on a sample, the scattered light being the irradiation light scattered by the sample;
a bottom wall that connects lower ends of the first holding wall and the second holding wall and includes an anode plate and a cathode plate; and
a first lock portion having an arm shape, one end portion of the first lock portion including a fitting portion, and the other end portion of the first lock portion being pivotally supported by an end portion of the first holding wall and an end portion of the second holding wall at a locked position and an unlocked position,
wherein the measurement jig includes:
a cell that includes a recess in which the sample is disposed at a position where the irradiation light is irradiated; and
a first fitted portion that is elastically fitted with the fitting portion when the first lock portion is at the locked position,
the plating jig includes:
a plating solution holder that includes:
a recess in which a plating solution for plating the anode plate and the cathode plate is disposed; and
a second fitted portion that is elastically fitted with the fitting portion when the first lock portion is at the locked position, and
wherein the measurement jig and the plating jig are selectively interchanged and attached to the frame.

9. The zeta-potential measurement jig set according to claim 8, wherein
the measurement jig includes:
a lower block that includes an anode hole portion and a cathode hole portion, at which the anode plate and the cathode plate are respectively positioned, and disposed on the bottom wall, the anode hole portion and the cathode hole portion being provided to a bottom of the lower block;
a cell communication hole communicating with each of the anode hole portion and the cathode hole portion on a bottom surface of the recess of the cell, being formed of a material that transmits the irradiation light and the scattered light, and being disposed on the lower block;
a middle block that has a frame-like shape surrounding the recess of the cell in a plan view and is disposed above the cell;
an upper member that is disposed on the middle block and covers an upper surface of the recess of the cell; and
a second lock portion that presses the upper member toward the bottom wall to integrate the frame, the lower block, the cell, the middle block, and the upper member.

10. The zeta-potential measurement jig set according to claim 9, wherein
the plating solution holder includes a plating solution communication hole on a bottom surface of the recess in which the plating solution is disposed so as to communicate with the anode hole portion and the cathode hole portion.

11. The zeta-potential measurement jig set according to set claim 9, wherein
the lower block includes:
a first seal that surrounds the anode hole portion and the cathode hole portion on a surface in contact with the bottom wall; and a second seal that surrounds the anode hole portion and the cathode hole portion on a surface in contact with the cell, the middle block includes:
a third seal the surrounds the recess of the cell on a surface in contact with the cell; and
a fourth seal in contact with the upper member.

12. The zeta-potential measurement jig set according to claim 11, wherein
the second lock portion has a long axis direction and a short axis direction and is changed in a thickness from a center to end portions,
the first holding wall and the second holding wall respectively have engagement holes that are engaged with the respective end portions of the second lock portion, and
the second lock portion is rotatable in an in-plane direction of the bottom wall, and presses the upper member toward the bottom wall when the respective end portions of the second lock portion are engaged with the respective engagement holes.

13. The zeta-potential measurement jig set according to claim 11, wherein
the upper member includes:
a cell upper-surface retaining portion that is disposed on the cell and presses an upper surface of the cell toward the bottom wall; and
an upper block that is disposed above the middle block and presses the middle block and the fourth seal provided in the middle block toward the bottom wall.

14. The zeta-potential measurement jig set according to claim 13, wherein
the upper block includes a through-hole passing in a vertical direction above the cell, and
the measurement jig further includes a pressing portion that is disposed in the through-hole and presses the cell upper-surface retaining portion against the cell.

15. The zeta-potential measurement jig set according to claim 9, wherein
the first lock portion elastically presses the middle block toward the bottom wall to integrate the frame, the lower block, the cell, and the middle block.

16. The zeta-potential measurement jig set according to claim 9, wherein
the lower block includes a supply path that supplies the sample to the anode hole portion and the cathode hole portion.

17. The zeta-potential measurement jig set according to claim 8, wherein
the plating jig further includes a lid that is fitted with the recess of the plating solution holder and covers an upper surface of the recess of the plating solution holder, the plating solution being disposed in the recess of the plating solution holder, and
the lid includes a pressure release hole that communicates the upper surface of the recess of the plating solution holder in which the plating solution is disposed.

* * * * *